United States Patent
Ono et al.

(10) Patent No.: US 8,349,513 B2
(45) Date of Patent: Jan. 8, 2013

(54) POLYMER ELECTROLYTE MEMBRANE, MEMBRANE-ELECTRODE ASSEMBLY AND POLYMER ELECTROLYTE FUEL CELL

(75) Inventors: Tomohiro Ono, Tsukuba (JP); Shinji Nakai, Tsukuba (JP); Hiroyuki Ogi, Tsukuba (JP); Takeshi Nakano, Tsukuba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 1134 days.

(21) Appl. No.: 12/278,794

(22) PCT Filed: Feb. 5, 2007

(86) PCT No.: PCT/JP2007/051909
§ 371 (c)(1),
(2), (4) Date: Aug. 8, 2008

(87) PCT Pub. No.: WO2007/094185
PCT Pub. Date: Aug. 23, 2007

(65) Prior Publication Data
US 2010/0167159 A1 Jul. 1, 2010

(30) Foreign Application Priority Data

Feb. 13, 2006 (JP) ................................. 2006-034682
Feb. 24, 2006 (JP) ................................. 2006-049002
Mar. 23, 2006 (JP) ................................. 2006-080930

(51) Int. Cl.
*H01M 8/10* (2006.01)
(52) U.S. Cl. .................... 429/483; 429/479; 429/482
(58) Field of Classification Search ................ 429/482
See application file for complete search history.

(56) References Cited

U.S. PATENT DOCUMENTS
5,468,574 A 11/1995 Ehrenberg et al.
(Continued)

FOREIGN PATENT DOCUMENTS
JP 6-093114 4/1994
(Continued)

OTHER PUBLICATIONS
U.S. Appl. No. 11/722,834, filed Jun. 26, 2007, Yamashita, et al.
(Continued)

*Primary Examiner* — Raymond Alejandro
*Assistant Examiner* — Gary Harris
(74) *Attorney, Agent, or Firm* — Oblon, Spivak, McClelland, Maier & Neustadt, L.L.P.

(57) ABSTRACT

A polymer electrolyte membrane comprising as a main ingredient a block copolymer which comprises, as its constituents, a polymer block (A) having as a main unit an aromatic vinyl compound unit and a polymer block (B) forming a flexible phase, and has ion-conducting groups on the polymer block (A), said aromatic vinyl compound unit being such that the hydrogen atom bonded to the α-carbon atom is non-replaced or replaced with an alkyl group or an aryl group optionally having substituent(s), and at least one of hydrogen atoms directly bonded to the aromatic ring is replaced with an alkyl group; and a membrane electrode assembly and a polymer electrolyte fuel cell both of which uses it. The polymer block (A) can have a restraining phase, and/or can be cross-linked. The electrolyte membrane is mild to the environment, has a high ion conductivity and good bonding properties to electrodes, is excellent in moldability, and is not easily influenced by methanol; and displays excellent performance in polymer electrolyte fuel cells, particularly direct methanol fuel cells.

16 Claims, 1 Drawing Sheet

U.S. PATENT DOCUMENTS

| | | | |
|---|---|---|---|
| 6,022,928 | A | 2/2000 | Inagaki et al. |
| 6,413,298 | B1* | 7/2002 | Wnek et al. .................. 95/52 |
| 6,503,378 | B1 | 1/2003 | Fisher |
| 7,737,224 | B2 | 6/2010 | Willis et al. |
| 2004/0005490 | A1 | 1/2004 | Fan et al. |
| 2004/0038107 | A1 | 2/2004 | Fan et al. |
| 2004/0086764 | A1* | 5/2004 | Paronen ...................... 429/33 |
| 2008/0014505 | A1 | 1/2008 | Kato et al. |
| 2008/0113244 | A1 | 5/2008 | Yamashita et al. |
| 2010/0159353 | A1 | 6/2010 | Ohgi et al. |
| 2010/0203782 | A1 | 8/2010 | Willis et al. |
| 2010/0203783 | A1 | 8/2010 | Willis et al. |
| 2010/0203784 | A1 | 8/2010 | Willis et al. |
| 2010/0203785 | A1 | 8/2010 | Willis et al. |
| 2010/0203786 | A1 | 8/2010 | Hashimoto et al. |
| 2010/0204403 | A1 | 8/2010 | Willis et al. |
| 2010/0298514 | A1 | 11/2010 | Willis et al. |

FOREIGN PATENT DOCUMENTS

| | | |
|---|---|---|
| JP | 10 101731 | 4/1998 |
| JP | 10 503788 | 4/1998 |
| JP | 11-203936 | 7/1999 |
| JP | 11 203936 | 7/1999 |
| JP | 2001-210336 | 3/2001 |
| JP | 2001 210336 | 8/2001 |
| JP | 2001-210336 A | 8/2001 |
| JP | 2002 294088 | 10/2002 |
| JP | 2002-294088 | 10/2002 |
| JP | 2002-294088 A | 10/2002 |
| JP | 2003 142125 | 5/2003 |
| JP | 2003-142125 | 5/2003 |
| JP | 2003-288916 | 10/2003 |
| JP | 2003-331868 | 11/2003 |
| JP | 2004 504928 | 2/2004 |
| JP | 2004-247185 | 9/2004 |
| JP | 2004 247185 | 9/2004 |
| JP | 2005 509243 | 4/2005 |
| JP | 2005-322491 | 11/2005 |
| JP | 2005 322491 | 11/2005 |
| JP | 2006 210326 | 8/2006 |
| JP | 2006-210326 | 8/2006 |
| JP | 2006 286521 | 10/2006 |
| JP | 2006-286521 | 10/2006 |
| JP | 2007 42573 | 2/2007 |
| JP | 2007-42573 | 2/2007 |
| WO | WO 95/32236 | 11/1995 |
| WO | 2004 045014 | 5/2004 |
| WO | WO 2004/045014 A2 | 5/2004 |

OTHER PUBLICATIONS

U.S. Appl. No. 12/162,375, filed Jul. 28, 2008, Ono, et al.

Feng Wang, et al. "Direct Polymerization of Sulfonated Poly(Arylene Ether Sulfone) Random (Statistical) Copolymers: Candidates for New Proton Exchange Membranes", Journal of Membrane Science, 197, 2002, pp. 231-242.

Yossef A. Elabd, et al. "Triblock Copolymer Ionomer Membranes Part I. Methanol and Proton Transport", Journal of Membrane Science, 217, 2003, pp. 227-242.

Jongok Won, et al. "Structural Characterization and Surface Modification of Sulfonated Polystyrene-(Ethylene-Butylene)-Styrene Triblock Proton Exchange Membranes", Journal of Membrane Science, 214, 2003, pp. 245-257.

U.S. Appl. No. 12/523,814, filed Jul. 20, 2009, Ohgi, et al.

Japanese Office Action issued Mar. 6, 2012 in patent application No. 2006-034682 with English translation.

Japanese Office Action issued Mar. 6, 2012 in patent application No. 2006-080930 with English translation.

* cited by examiner

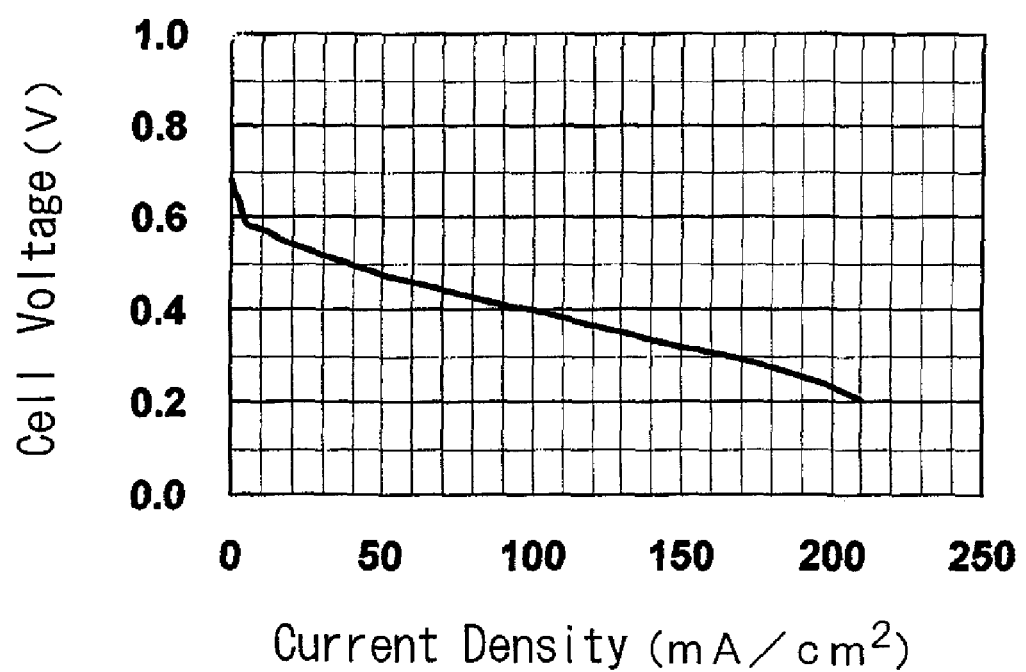

POLYMER ELECTROLYTE MEMBRANE, MEMBRANE-ELECTRODE ASSEMBLY AND POLYMER ELECTROLYTE FUEL CELL

TECHNICAL FIELD

This invention relates to a polymer electrolyte membrane used in polymer electrolyte fuel cells, preferably polymer electrolyte direct methanol fuel cells, and a membrane electrode assembly and a fuel cell in both of which the polymer electrolyte membrane is used.

BACKGROUND ART

In recent years, as a radical solution of energetic and/or environmental problems, and, further, as a central energy conversion system in the future age of hydrogen energy, fuel cell technique has drawn attention. Especially, polymer electrolyte fuel cells (PEFC) are tried to be applied as power sources for electric automobiles, power sources for portable instruments, and, further, applied to domestically stationary power source apparatuses utilizing electricity and heat at the same time, for the reason that miniaturization and lightening are possible, etc.

A polymer electrolyte fuel cell is generally composed as follows. First, on both sides of a polymer electrolyte membrane having ion conductivity, catalyst layers comprising a platinum group metal catalyst supported on carbon powder and an ion-conducting binder comprising a polymer electrolyte are formed, respectively. On the outsides of the catalyst layers, gas diffusion layers as porous materials through which fuel gas and oxidant gas can pass are formed, respectively. As the gas diffusion layers, carbon paper, carbon cloth, etc. are used. An integrated combination of the catalyst layer and the gas diffusion layer is called a gas diffusion electrode, and a structure wherein a pair of gas diffusion electrodes are bonded to the electrolyte membrane so that the catalyst layers can face to the electrolyte membrane, respectively, is called a membrane electrode assembly (MEA). On both sides of the membrane electrode assembly, separators having electric conductivity and gastightness are placed. Gas passages supplying the fuel gas or oxidant gas (e.g., air) onto the electrode surfaces are formed, respectively, at the contact parts of the membrane electrode assembly and the separators or inside the separators. Power generation is started by supplying a fuel gas such as hydrogen or methanol to one electrode (fuel electrode) and an oxidant gas containing oxygen such as air to the other electrode (oxygen electrode). Namely, the fuel gas is ionized at the fuel electrode to form protons and electrons, the protons pass through the electrolyte membrane and transferred to the oxygen electrode, the electrons are transferred via an external circuit formed by connecting both electrodes into the oxygen electrode, and they react with the oxidant gas to form water. Thus, the chemical energy of the fuel gas is directly converted into electric energy which can be taken out.

For practical implementation and spread of polymer electrolyte fuel cells, as to the aspect of performance, in addition to high power generation performance, it is important that they can be operated stably for a long time. In polymer electrolyte fuel cells, particularly polymer electrolyte fuel cells using methanol as a fuel, the structure of the electrolyte membrane, particularly the structure of ion-conducting channels formed by aggregation of sulfonic acid groups or the like as an ion-conducting group is liable to change, and, thus, power generation characteristics are also liable to change. Therefore, an electrolyte membrane is desired which, on the one hand, has high power generation performance, and, on the other hand, is not easily influenced by methanol, for example, an electrolyte membrane which, in addition to high power generation performance, has low methanol permeability, or an electrolyte membrane wherein, in addition to high power generation performance, change of characteristics, particularly characteristics such as methanol permeability and ion conductivity between before and after power generation, which, in the electrolyte membrane, corresponds to before and after the treatment of immersion in a methanol solution, is small.

In general, a polymer electrolyte fuel cell is not steadily operated, but starting, operation and stop are made repeatedly. Although, during operation, the polymer electrolyte membrane is under a wet state, during stop, lowering of humidity is liable to occur. Therefore, an electrolyte membrane is desired wherein change of dimensions and/or change of dynamic characteristics between under a state of low humidity (under a dry state) and under a wet state are/is small. Further, an electrolyte membrane is desired which is excellent in starting properties so that it could display a certain level of characteristics immediately after the operation circumstance is changed, for example so that stable operation could be made immediately after starting.

As polymer electrolyte membranes for polymer electrolyte fuel cells, Nafion (registered trade mark of Dupont Co., as is the same hereinafter), which is a perfluorocarbonsulfonic acid polymer, is used by reason of being chemically stable. However, Nafion has a disadvantage that methanol is liable to permeate it, and, in polymer electrolyte fuel cells using methanol as a fuel, a phenomenon that methanol permeates the electrolyte membrane from one electrode side to the other electrode side (methanol crossover) is liable to occur, and, therefore, sufficient performance is hard to obtain. Further, since Nafion has a property that change of dynamic characteristics between during a dry state and during a wet state is large, performance tends to be lowered during a long-term power generation test. In addition, since Nafion is a fluoropolymer, consideration to the environment at the time of its synthesis and disposal is necessary, and fluoropolymers are expensive. Therefore, development of novel electrolyte membranes is desired.

Thus, non-perfluorocarbonsulfonic acid polymer electrolyte membranes having small methanol permeability have been studied (Patent documents 1 to 4 and Non-patent documents 1 to 3).

Engineering plastic polymer electrolyte membranes described in Patent documents 1 to 3 and Non-patent document 1 do not readily form ion channels, which is different from the case of perfluorocarbonsulfonic acid polymer electrolyte membranes, and it is possible to reduce methanol permeability. However, they have a defect that the electric resistance of the membrane is relatively high, and when the electric resistance of the membrane is lowered by increasing the amount of ionic groups introduced, it is liable to swell easily. Further, a defect that imperfect bonding to electrodes tends to occur is also known. Therefore, it is the present state of things that engineering plastic polymer electrolyte membranes have not displayed sufficient performance as an electrolyte membrane used in direct methanol fuel cells.

As polymer electrolyte membranes using a non-fluoropolymer as a base, an electrolyte membrane is also proposed wherein the polystyrene block of a block copolymer composed of styrene and a rubber component is sulfonated to make the rubber component function as a matrix and make the polystyrene block function as ion-conducting channels (Non-patent documents 2 and 3 and Patent document 4). For example, in Non-patent document 2, as an inexpensive and mechanically and chemically stable polymer electrolyte membrane is proposed a polymer electrolyte membrane comprising a sulfonated SEBS (SEBS is an abbreviation of a polystyrene-poly(ethylene-butylene)-polystyrene triblock copolymer). In Patent document 4, a polymer electrolyte membrane comprising a sulfonated SEBS is also described as an inexpensive and mechanically and chemically stable polymer electrolyte membrane.

However, it is described that these electrolyte membranes are such that their structure is largely changed in a methanol solution (Non-patent document 2). This suggests that when the resulting electrolyte membranes are immersed in a methanol solution, their characteristics such as methanol permeability and ion conductivity are largely changed. As a result of actual tests by us, it was made clear that these polymer electrolyte membranes are such that, between before and after a treatment of immersion in a methanol solution, characteristics such as methanol permeability and ion conductivity are changed largely, and, between during a dry state and during a wet state, dynamic characteristics such as a tensile characteristic are changed largely. By that change of these characteristics is large, it is meant that when such a membrane is used in a fuel cell, it is difficult to operate it stably for a long time.

It is described in Non-patent document 3 that sulfonated polystyrene-b-polyisobutylene-b-polystyrene triblock copolymers (sulfonated SiBuS) also have higher methanol barrier properties compared with perfluorocarbonsulfonic acid polymer electrolyte membranes, but it is the present state of things that electrolyte membranes having satisfactory performance for direct methanol fuel cells have not yet been obtained.

Patent document 1: JP-A-2003-288916
Patent document 2: JP-A-2003-331868
Patent document 3: JP-A-6-93114
Patent document 4: JP-A-10-503788
Non-patent document 1: J. Membrane Science 197 (2003) 231
Non-patent document 2: J. Membrane Science 217 (2003) 227
Non-patent document 3: J. Membrane Science 214 (2003) 245

DISCLOSURE OF INVENTION

Problems to be Solved by the Invention

The object of this invention is to provide a polymer electrolyte membrane which has high ion conductivity and good bonding properties to electrodes, and is not easily influenced by methanol, and a membrane electrode assembly and a polymer electrolyte fuel cell in both of which the electrolyte membrane is used.

Means for Solving the Problems

The present inventors have intensely studied for solving the above problems, and as a result, they found that an electrolyte membrane consisting of a specific block copolymer or containing it as a main component, can solve the above problems, and completed the invention.

Thus, this invention relates to a polymer electrolyte membrane comprising as a main ingredient a block copolymer which comprises, as its constituents, a polymer block (A) having as a main unit (=a main repeating unit) an aromatic vinyl compound unit and a polymer block (B) forming a flexible phase, and has ion-conducting groups on the polymer block (A), said aromatic vinyl compound unit being such that the hydrogen atom bonded to the α-carbon atom is non-replaced or replaced with an alkyl group having 1 to 4 carbon atoms or an aryl group which has 6 to 14 carbon atoms and can have 1 to 3 substituents, and at least one of hydrogen atoms directly bonded to the aromatic ring is replaced with an alkyl group having 1 to 8 carbon atoms. The above embodiment of the invention is named a basic embodiment. The most characteristic part of the basic embodiment is that, in the aromatic vinyl compound unit as the repeating unit in polymer block (A), at least one of hydrogen atoms directly bonded to the aromatic ring is replaced with an alkyl group having 1 to 8 alkyl group.

In the above block copolymer, polymer block (A) and polymer block (B) have a property that they micro phase separate from each other and polymer block (A) themselves and polymer block (B) themselves gather, respectively, and, since polymer block (A) has ion-conducting groups, ion channels are formed by gathering of polymer block (A) themselves and function as paths of protons. By the presence of polymer block (B), the block copolymer takes on elasticity and becomes flexible as a whole, and in production of membrane electrode assemblies and polymer electrolyte fuel cells, moldability (assembling properties, bonding properties, fastening properties, etc.) is improved. Polymer block (B) forming a flexible phase is composed of an alkene unit, a conjugated diene unit or the like. The ion-conducting groups include a sulfonic acid group and a phosphonic acid group and their salts, and are bonded to polymer block (A).

The present invention contains the following three more specific embodiments. The three embodiments have the characteristic of the basic embodiment in common.

(1) A specific embodiment wherein the basic embodiment is made more specific, and polymer block (A) is a polymer block (A1) comprising as a main unit an aromatic vinyl compound unit represented by the following general formula (I)

wherein $Ar^1$ represents an aryl group having 6 to 14 carbon atoms which aryl group is substituted with one alkyl group having 1 to 8 carbon atoms and can further have one or two substituents, and $R^1$ represents a hydrogen atom, an alkyl group having 1 to 4 carbon atoms or an aryl group having 6 to 14 carbon atoms which aryl group can have 1 to 3 substituents, This embodiment is hereinafter sometimes called Embodiment 1 (alkyl substitution) or the like from the characteristic of this embodiment.

(2) A specific embodiment wherein, in the basic embodiment, polymer block (A) is a polymer block (A2) composed of a polymer block (A2a) having ion-conducting groups and a polymer block (A2b) having no ion-conducting group and forming a restraining phase. Both of polymer block (A2a) and polymer block (A2b) have an aromatic vinyl compound unit as a main unit.

More specifically, this specific embodiment is an embodiment wherein, in the basic embodiment, polymer block (A) is a polymer block (A2) which is composed of a polymer block (A2a) having as a main unit an aromatic vinyl compound unit represented by the following general formula (II)

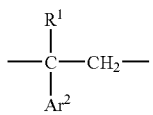

(II)

wherein Ar² represents an aryl group having 6 to 14 carbon atoms which aryl group can have 1 to 3 substituents, R¹ represents a hydrogen atom, an alkyl group having 1 to 4 carbon atoms or an aryl group having 6 to 14 carbon atoms which aryl group can have 1 to 3 substituents,
and a polymer block (A2b) forming a restraining phase, and polymer block (A2b) is a polymer block (A2b1) having as a main unit an aromatic vinyl compound unit represented by the following general formula (III)

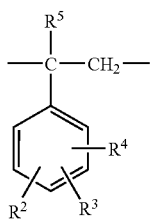

(III)

wherein each of R² to R⁴ represents, mutually independently, a hydrogen atom or an alkyl group having 1 to 8 carbon atoms but at least one of them is an alkyl group having 1 to 8 carbon atoms, and R⁵ represents a hydrogen atom or an alkyl group having 1 to 4 carbon atoms,
or a crystalline polyolefin block.

This embodiment is hereinafter sometimes called Embodiment 2 (restraining phase) or the like from the characteristic of this embodiment.

(3) A specific embodiment wherein, in the embodiment of (1) and the embodiment of (2), polymer block (A) themselves having ion-conducting groups are mutually cross-linked.

The cross-linking is conducted according to a cross-linking method using a polyamine, a radical cross-linking method or the like. Radical cross-linking progresses through such a mechanism or the like that the hydrogen atom bonded to the carbon atom at the 1-position of an alkyl group bonded to the aromatic ring of the aromatic vinyl compound unit is drawn out by heating or a radical to form a radical, and radicals themselves thus formed are bonded. Thus, in this embodiment, it is necessary that the carbon atom at the 1-position of an alkyl group bonded to the aromatic ring of the aromatic vinyl compound unit is bonded to at least one hydrogen atom.

This embodiment is hereinafter sometimes called Embodiment 3 (cross-linking) or the like from the characteristic of this embodiment.

In any of the embodiments (1), (2) and (3), it is preferred that polymer block (B) is a polymer block having as a main unit a unit selected from the group consisting of an alkene unit, a cycloalkene unit, a vinylcycloalkene unit, a conjugated diene unit and a conjugated cycloalkadiene unit; and a vinylcycloalkene unit, a conjugated diene unit and a conjugated cycloalkadiene unit in which units, part or all of carbon-carbon double bonds are hydrogenated.

As the ion-conducting group, a sulfonic acid group or a phosphonic acid group or salts of them can be used preferably.

This invention also relates to a membrane electrode assembly and a fuel cell both of which use the above electrolyte membrane.

Effect of the Invention

The polymer electrolyte membrane of the invention is a polymer electrolyte membrane which is mild to the environment and has high ion conductivity and good bonding properties to electrodes, is excellent in moldability and is not easily influenced by methanol, and displays excellent performance in polymer electrolyte fuel cells, particularly direct methanol fuel cells.

The polymer electrolyte membrane of Embodiment (1) particularly has a characteristic that it has low methanol permeability and is excellent in methanol barrier properties. The polymer electrolyte membrane of Embodiment (2) particularly has characteristics that change of dimensions and/or change of dynamic characteristics (tensile characteristic, etc) between during a dry state and during a wet state are small, and change of characteristics such as methanol permeability between before and after the treatment of immersion in a methanol solution is small, and, therefore, stable performance can be displayed over a long time. Further, the electrolyte membrane of Embodiment (2) also has a characteristic to be capable of displaying a certain characteristic immediately after the operation circumstance was changed between a dry state and a wet state, and is also excellent in starting properties. The polymer electrolyte membrane of Embodiment (3) particularly has a characteristic that change of characteristics such as methanol permeability and ion conductivity between before and after the treatment of immersion in a methanol solution is small, and, therefore, can display stable performance over a long time.

BEST MODE FOR CARRYING OUT THE INVENTION

The invention is described in detail below. As mentioned above, the polymer electrolyte membrane of the invention has its characteristic in the block copolymer as its main ingredient, and the block copolymer is composed of polymer block (A) and polymer block (B). In the above three embodiments of the invention, polymer block (B) is used in common in any of the embodiments, but polymer block (A) is different in each embodiment. Nevertheless, the three embodiments have a common characteristic that at least one of hydrogen atoms directly bonded to the aromatic ring of the aromatic vinyl compound unit constituting the main unit of polymer block (A) is replaced with an alkyl group having 1 to 8 alkyl group.

Polymer Block (A)

Polymer block (A) constituting the block copolymer used in the invention is a polymer block having as a main unit an aromatic vinyl compound unit wherein the hydrogen atom bonded to the α-carbon atom is not replaced or replaced with an alkyl group having 1 to 4 carbon atoms or an aryl group which has 6 to 14 carbon atoms and can have 1 to 3 substituents, and at least one of hydrogen atoms directly bonded to the aromatic ring is replaced with an alkyl group having 1 to 8 carbon atoms. Polymer block (A) has ion-conducting groups. In the above, the aromatic ring is preferably a carbocyclic aromatic ring, and there can be mentioned a benzene ring, a naphthalene ring, an anthracene ring, a pyrene ring, etc. The alkyl group having 1 to 8 carbon atoms directly bonded to this aromatic ring is preferably an alkyl group having 1 to 6 carbon atoms and more preferably an alkyl group having 1 to 4 carbon atoms, and may be straight-chain or branched chain.

The number of the alkyl group is preferably 1 to 3. The alkyl group having 1 to 4 carbon atoms which can be bonded to the α-carbon atom may be straight-chain or branched chain. As the aryl group having 6 to 14 carbon atoms which can be bonded to the α-carbon atom, there can be mentioned phenyl, naphthyl, phenanthryl, anthryl, indenyl, biphenylyl, pyrenyl, etc., and as its substituent(s), there can be mentioned straight-chain or branched chain alkyl groups having 1 to 4 carbon atoms, halogenated alkyl groups having 1 to 4 carbon atoms, etc.

The above definition on polymer block (A) is a superordinate concept of the following three embodiments of polymer block (A).

Embodiment 1 (Alkyl Substitution)

This embodiment is such that the above basic embodiment is further specified, and its most characteristic matter is that, in the aromatic vinyl compound unit as a unit (=repeating unit) in polymer block (A), at least one of hydrogen atoms directly bonded to the aromatic ring is replaced with an alkyl group having 1 to 8 carbon atoms. A polymer electrolyte membrane comprising as a main ingredient a block copolymer containing a block copolymer (A) of Embodiment 1 particularly has a characteristic that it has low methanol permeability and is excellent in methanol barrier properties.

In this embodiment, polymer block (A) can be defined as a polymer block (A1) having as a main unit an aromatic vinyl compound unit represented by the following general formula (I)

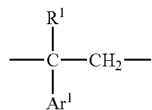

(I)

wherein $Ar^1$ represents an aryl group having 6 to 14 carbon atoms which is substituted with one alkyl group having 1 to 8 carbon atoms and can further have one or two substituents, and $R^1$ represents a hydrogen atom, an alkyl group having 1 to 4 carbon atoms or an aryl group having 6 to 14 carbon atoms which can have 1 to 3 substituents.

Polymer block (A1) can have only one of the above aromatic vinyl compound units or two or more of them.

In the definition of $Ar^1$, as the aryl group having 6 to 14 carbon atoms, there can be mentioned phenyl, naphthyl, phenanthryl, anthryl, indenyl, biphenylyl, pyrenyl, etc., and phenyl and naphthyl are preferred and phenyl is further preferred. As the alkyl group having 1 to 8 carbon atoms directly bonded to the aromatic ring of the aryl group, an alkyl group having 1 to 6 carbon atoms is preferred and an alkyl group having 1 to 4 carbon atoms is further preferred. The alkyl group may be straight-chain or branched chain, and there can be mentioned methyl, ethyl, propyl, isopropyl, butyl, tert-butyl, neopentyl, hexyl, heptyl, 2-ethylhexyl, etc. As the optional further one or two substituents directly bonded to the aromatic ring of the aryl group, there can, respectively independently, be mentioned straight-chain or branched chain alkyl groups each having 1 to 4 carbon atoms (methyl, ethyl, propyl, isopropyl, butyl, etc.), halogenated alkyl groups each having 1 to 4 carbon atoms (chloromethyl, 2-chloroethyl, 3-chloropropyl, etc.), etc.

In the definition of $R^1$, as the alkyl group having 1 to 4 carbon atoms, there can be mentioned methyl, ethyl, propyl, isopropyl, butyl, tert-butyl, etc., and methyl and ethyl are preferred and methyl is further preferred. In the definition of $R^1$, as the aryl group having 6 to 14 carbon atoms, there can be mentioned similar ones as in the definition of $Ar^1$, and phenyl and naphthyl are preferred and phenyl is further preferred. As the substituent(s) with which the aryl group can be substituted, there can, respectively independently, be mentioned straight-chain or branched chain alkyl groups each having 1 to 4 carbon atoms (methyl, ethyl, propyl, isopropyl, butyl, etc.), halogenated alkyl groups each having 1 to 4 carbon atoms (chloromethyl, 2-chloroethyl, 3-chloropropyl, etc.), etc. As $R^1$, a hydrogen atom or a methyl group is particularly preferred.

It is preferred that the aromatic vinyl compound unit represented by the general formula (I) is an aromatic vinyl compound unit represented by the following general formula (Ia)

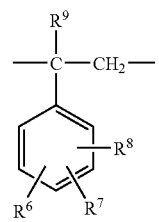

(Ia)

wherein $R^6$ to $R^8$ represent, respectively independently, hydrogen atoms or alkyl groups each having 1 to 4 carbon atoms, but at least one of them is an alkyl group having 1 to 4 carbon atoms, and $R^9$ represents an hydrogen atom, an alkyl group having 1 to 4 carbon atoms or a phenyl group.

The alkyl groups in $R^6$ to W and the alkyl group in $R^9$ may be straight-chain or branched chain, and there can be mentioned methyl, ethyl, propyl, isopropyl, butyl, tert-butyl, etc.

As specific examples of aromatic vinyl compounds giving the unit represented by the general formula (Ia), there can be mentioned alkyl-substituted styrenes wherein an alkyl group having 1 to 4 carbon atoms such as methyl, ethyl, propyl, n-butyl, isobutyl or tert-butyl is bonded to the o-, m- or p-position; alkyl-substituted α-methylstyrenes wherein an alkyl group having 1 to 4 carbon atoms such as methyl, ethyl, propyl, n-butyl, isobutyl or tert-butyl is bonded to the o-, m- or p-position; etc., and, among them, p-methylstyrene, 4-tert-butylstyrene, α,p-dimethylstyrene, o,p-dimethylstyrene, etc. are preferably used. These aromatic vinyl compounds can be used alone or in a combination of two or more. The form of copolymerization in the case where two or more of them are copolymerized may be random copolymerization, block copolymerization, graft copolymerization or tapered copolymerization.

Polymer block (A1) can contain another aromatic vinyl compound unit besides the aromatic vinyl compound unit represented by the general formula (I). As aromatic vinyl compounds giving said another aromatic vinyl compound unit, there can, for example, be mentioned styrene, α-methylstyrene, vinylnaphthalene, α-methylvinylnaphthalene, vinylanthracene, vinylpyrene, etc.

The form of copolymerization in the case where two or more of aromatic vinyl compounds giving the aromatic vinyl compound unit represented by the general formula (I) are copolymerized and in the case where the aromatic vinyl compound and said another aromatic vinyl compound are copolymerized may be random copolymerization, block copolymerization, graft copolymerization or tapered copolymerization.

Polymer block (A1) can contain one or plural monomer units other than aromatic vinyl compound units in such a range that the effects of the invention are not spoiled. As monomers giving such other monomer units, there can, for example, be mentioned conjugated dienes having 4 to 8 carbon atoms (specific examples are the same as in the description of polymer block (B) mentioned later); alkenes having 2 to 8 carbon atoms (specific examples are the same as in the description of polymer block (B) mentioned later); (meth) acrylic esters (methyl (meth)acrylate, ethyl(meth)acrylate, butyl(meth)acrylate, etc.); vinyl esters (vinyl acetate, vinyl propionate, vinyl butyrate, vinyl pivalate, etc.); vinyl ethers (methyl vinyl ether, isobutyl vinyl ether, etc.); etc. The form of copolymerization of the aromatic vinyl compound with monomer(s) other than the aromatic vinyl compound needs to be random copolymerization.

In order to form ion channels and inhibit methanol crossover, the proportion of the aromatic vinyl compound unit represented by the general formula (I) in polymer block (A1) is preferably 10% by mass or more, more preferably 15% by mass or more and still more preferably 20% by mass or more of polymer block (A1). The proportion of monomer unit(s) other than the aromatic vinyl compound unit in polymer block (A1) is preferably 50% by mass or less, more preferably 30% by mass or less and still more preferably 10% by mass or less.

The molecular weight of polymer block (A1) is suitably chosen depending on the nature and state, desired performance, other polymer components, etc. of the polymer electrolyte membrane. When the molecular weight is large, dynamic characteristics such as tensile strength of the polymer electrolyte membrane tend to be higher, whereas when the molecular weight is small, the electric resistance of the polymer electrolyte membrane tends to be smaller, and it is important to suitably choose the molecular weight in accordance with necessary performance. Usually, the molecular weight of polymer block (A1) is preferably chosen between 100 and 1,000,000, and more preferably chosen between 1,000 and 100,000, as number average molecular weight in terms of polystyrene, in a state that an ion-conducting group is not introduced.

Embodiment 2 (Restraining Phase)

In Embodiment 2 of the invention, polymer block (A) has, besides polymer block (A2a) having ion-conducting groups, a polymer block (A2b) which is a polymer block (A2b1) having as a main unit an aromatic vinyl compound unit or a crystalline polyolefin block, and forms a restraining phase (a phase functioning so as to hold phase separation structure of the block copolymer). As stated in the item of BACKGROUND ART, in polymer electrolyte fuel cells, change of humidity is liable to occur between during operation and during stop, and a polymer electrolyte membrane wherein dimensional change and/or change of dynamic characteristics (tensile strength, etc.) in the meantime are/is small is sought, and, further, a polymer electrolyte membrane is sought wherein change of characteristics, particularly characteristics such as methanol permeability and ion conductivity between before and after power generation, which, in direct methanol polymer electrolyte fuel cells, corresponds to before and after the treatment of immersion in a methanol solution, is small, but, in general, these characteristics are lowered during long-time operation. Embodiment 2 aims to maintain these characteristics by placing a polymer block (A2b) forming a restraining phase.

In Embodiment 2, polymer block (A) can be defined as a polymer block (A2) which is composed of a polymer block (A2a) having as a main unit an aromatic vinyl compound unit represented by the general formula (II)

(II)

wherein $Ar^2$ represents an aryl group having 6 to 14 carbon atoms which can have 1 to 3 substituents, and $R^1$ represents a hydrogen atom, an alkyl group having 1 to 4 carbon atoms or an aryl group having 6 to 14 carbon atoms which can have 1 to 3 substituents, and a polymer block (A2b) forming a restraining phase, which polymer block (A2b) is a polymer block (A2b1) having as a main unit an aromatic vinyl compound unit represented by the general formula (III)

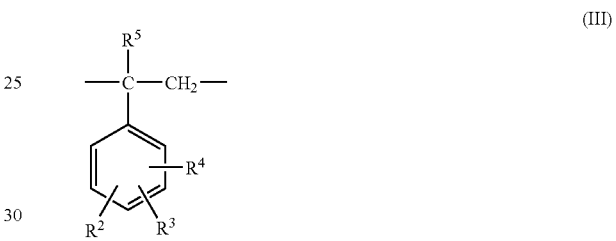

(III)

wherein each of $R^2$ to $R^4$ represents, mutually independently, a hydrogen atom or an alkyl group having 1 to 8 carbon atoms but at least one of $R^2$ to $R^4$ is an alkyl group having 1 to 8 carbon atoms, and $R^5$ represents a hydrogen atom or an alkyl group having 1 to 4 carbon atoms, or a crystalline polyolefin block.

In Embodiment 2, the ion-conducting groups are introduced in or made to exist in polymer block (A2a). Polymer block (A2a) may contain only one kind of the aromatic vinyl compound units represented by the general formula (II) or two or more kinds thereof, and polymer block (A2b1) may contain only one kind of the aromatic vinyl compound units represented by the general formula (III) or two or more kinds thereof.

Polymer Block (A2a) in Embodiment 2

In the definition of $Ar^2$ in the general formula (II), as the aryl group having 6 to 14 carbon atoms, there can be mentioned phenyl, naphthyl, phenanthryl, anthryl, indenyl, biphenylyl, pyrenyl, etc., and phenyl and naphthyl are preferred and phenyl is further preferred. As said 1 to 3 substituents which can directly be bonded to the aromatic ring of this aryl group, there can, respectively independently, be mentioned straight-chain or branched chain alkyl groups each having 1 to 4 carbon atoms (methyl, ethyl, propyl, isopropyl, butyl, etc.), halogenated alkyl groups each having 1 to 4 carbon atoms (chloromethyl, 2-chloroethyl, 3-chloropropyl, etc.), etc.

$R^1$ in the general formula (II) has the same meaning which $R^1$ in the general formula (I) has, and examples and preferred examples of the group are also the same.

When $R^1$ in the general formula (II) is an alkyl group having 1 to 4 carbon atoms, it is most preferred that $Ar^2$ has no substituent, but when $Ar^2$ has substituent(s), the number thereof is preferably 1 or 2 and more preferably 1. When $R^1$ is an aryl group having 6 to 14 carbon atoms, it is most preferred that both or one of this aryl group and $Ar^2$ have no substituent, but when both of them have substituent(s), the number thereof is preferably 1 or 2 and more preferably 1.

It is preferred that the aromatic vinyl compound unit represented by the general formula (II) is an aromatic vinyl compound unit represented by the general formula (IIa)

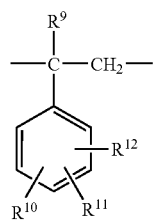

(IIa)

wherein each of $R^{10}$ to $R^{12}$ represents, mutually independently, a hydrogen atom or an alkyl group having 1 to 4 carbon atoms, and $R^9$ represents a hydrogen atom, an alkyl group having 1 to 4 carbon atoms or a phenyl group.

The alkyl group in $R^{10}$ to $R^{12}$ and the alkyl group in $R^9$ may be straight-chain or branched chain, and there can be mentioned methyl, ethyl, propyl, isopropyl, butyl, tert-butyl, etc.

When $R^9$ in the general formula (IIa) is an alkyl group having 1 to 4 carbon atoms, it is preferred that at least one of $R^{10}$ to $R^{12}$ is a hydrogen atom, it is further preferred that at least two of them are hydrogen atoms, and it is most preferred that all of them are hydrogen atoms.

As specific examples of aromatic vinyl compounds giving the aromatic vinyl compound unit represented by the general formula (II), there can be mentioned styrene, vinylnaphthalene, vinylanthracene, vinylphenanthrene, vinylbiphenyl, α-methylstyrene, 1-methyl-1-naphthylethylene, 1-methyl-1-biphenylylethylene, etc., and styrene and α-methylstyrene are particularly preferred.

Aromatic vinyl compounds giving the aromatic vinyl compound unit represented by the general formula (II) can be used alone or in a combination of two or more. The form of copolymerization in the case where two or more of them are copolymerized may be random copolymerization, block copolymerization, graft copolymerization or tapered copolymerization.

Polymer block (A2a) can contain one or plural monomer units other than aromatic vinyl compound units in such a range that the effects of the invention are not spoiled. As monomers giving such other monomer units, there can, for example, be mentioned conjugated dienes having 4 to 8 carbon atoms (specific examples are the same as in the description of polymer block (B) mentioned later); alkenes having 2 to 8 carbon atoms (specific examples are the same as in the description of polymer block (B) mentioned later); (meth) acrylic esters (methyl (meth)acrylate, ethyl(meth)acrylate, butyl(meth)acrylate, etc.); vinyl esters (vinyl acetate, vinyl propionate, vinyl butyrate, vinyl pivalate, etc.); vinyl ethers (methyl vinyl ether, isobutyl vinyl ether, etc.); etc. The form of copolymerization of the aromatic vinyl compound with said other monomer(s) needs to be random copolymerization.

In view of giving sufficient ion conductivity, the proportion of the aromatic vinyl compound unit represented by the general formula (II) in polymer block (A2a) is preferably 50% by mol or more, more preferably 60% by mol or more and still more preferably 80% by mol or more.

The molecular weight of polymer block (A2a) in such a state that ion-conducting groups are not introduced is suitably chosen depending on the nature and state, desired performance, other polymer components, etc. of the polymer electrolyte membrane, but, usually, the molecular weight is preferably chosen between 100 and 1,000,000, and more preferably chosen between 500 and 100,000, as number average molecular weight in terms of polystyrene.

Polymer Block (A2b) in Embodiment 2

Polymer block (A2b) is a polymer block (A2b1) having as a main unit an aromatic vinyl compound unit represented by the general formula (III), or a crystalline polyolefin block.

In the definition of $R^2$ to $R^4$ in the general formula (III), the alkyl group having 1 to 8 carbon atoms may be straight-chain or branched chain, and there can be mentioned methyl, ethyl, propyl, isopropyl, butyl, isobutyl, sec-butyl, tert-butyl, pentyl, isopentyl, neopentyl, tert-pentyl, hexyl, 1-methylpentyl, heptyl, octyl, etc. In the definition of $R^5$ in the general formula (III), the alkyl groups each having 1 to 4 carbon atoms may be straight-chain or branched chain, and there can be mentioned methyl, ethyl, propyl, isopropyl, butyl, isobutyl, tert-butyl, etc. As preferred specific examples of the aromatic vinyl compound unit represented by the general formula (III), there can be mentioned a p-methylstyrene unit, a 4-tert-butylstyrene unit, a p-methyl-α-methylstyrene unit, a 4-tert-butyl-α-methylstyrene unit, etc. Aromatic vinyl compounds giving these aromatic vinyl compound units may be used alone or in a combination of two or more. The form of copolymerization in the case where two or more of them are copolymerized may be random copolymerization, block copolymerization, graft copolymerization or tapered copolymerization.

Polymer block (A2b1) can contain monomer unit(s) other than aromatic vinyl compound units in such a range that the function as a restraining phase is not disturbed. As monomers giving such other monomer unit(s), there can, for example, be mentioned conjugated dienes having 4 to 8 carbon atoms (specific examples are the same as in the description of polymer block (B) mentioned later); (meth)acrylic esters (methyl (meth)acrylate, ethyl(meth)acrylate, butyl (meth)acrylate, etc.); vinyl esters (vinyl acetate, vinyl propionate, vinyl butyrate, vinyl pivalate, etc.); vinyl ethers (methyl vinyl ether, isobutyl vinyl ether, etc.); etc. The form of copolymerization of the aromatic vinyl compound with said other monomer(s) needs to be random copolymerization.

In view of displaying the function as a restraining phase, the proportion of the above-mentioned aromatic vinyl compound in polymer block (A2b1) is preferably 50% by mass or more, more preferably 70% by mass or more and still more preferably 90% by mass or more.

When polymer block (A2b) is composed of a crystalline polyolefin block, as the crystalline polyolefin block, there can be mentioned a crystalline polyethylene block, a crystalline polypropylene block, a crystalline hydrogenated 1,4-polybutadiene block, etc., and among them a crystalline hydrogenated 1,4-polybutadiene block is most preferred.

In view of micro phase-separating polymer block (A2b) from polymer block (A2a) and polymer block (B) and making polymer block (A2b) function as a restraining phase, as particularly preferred examples of polymer block (A2b), there can be mentioned polystyrene-type blocks such as a poly(p-methylstyrene) block, a poly(4-tert-butylstyrene) block, a poly(p-methyl-α-methylstyrene) block and a poly(4-tert-butyl-α-methylstyrene) block; a copolymer block synthesized from two or more of alkyl-substituted styrenes such as p-methylstyrene, 4-tert-butylstyrene, p-methyl-α-methylstyrene and 4-tert-butyl-α-methylstyrene in an optional mutual proportion; crystalline hydrogenated 1,4-polybutadiene blocks; crystalline polyethylene blocks; crystalline polypropylene blocks; etc.

Polymer block (A2b) may be cross-linked according to a known method in such a range that the effects of the invention are not spoiled. By introduction of cross-linking, such a tendency occurs that the restraining strength is further heightened, and change of the dimension and change of dynamic characteristics (tensile characteristics) between under a dry state and under a wet state, and, further, change of characteristics such as methanol permeability between before and after treatment with a methanol solution are further diminished.

The molecular weight of polymer block (A2b) is suitably chosen depending on the nature and state, desired performance, other polymer components, etc. of the polymer electrolyte membrane. When the molecular weight is large, dynamic characteristics of the polymer electrolyte membrane tend to be higher but too large dynamic characteristics make the block copolymer hard to mold, whereas when the molecular weight is small, the dynamic characteristics tend to be lowered, and it is important to suitably choose the molecular weight in accordance with necessary performance. Usually, the molecular weight of polymer block (A2b) is preferably chosen between 100 and 1,000,000, and more preferably chosen between 1,000 and 100,000, as number average molecular weight in terms of polystyrene.

Embodiment 3 (Cross-Linking)

In this embodiment of the invention, polymer block (A1) themselves in Embodiment 1 are cross-linked and the polymer block (A2a) themselves in Embodiment 2 are cross-linked. This cross-linking is made intermolecularly and/or intramolecularly. Polymer electrolyte membranes comprising as a main ingredient a block copolymer of this embodiment particularly have a characteristic that change in characteristics such as methanol permeability and ion conductivity between before and after immersion in a methanol solution is small, and can display stable performance over a long time.

As means of cross-linking, there are a cross-linking method using a polyamine, a radical cross-linking method, etc., and any of them can be used, but since the cross-linking is usually conducted together with preparation of polymer electrolyte membranes or after preparation thereof, cross-linking is described later in description on preparation of polymer electrolyte membranes. It is just noted that although cross-linking with a polyamine can be made with just the aforementioned structure of polymer block (A1) and polymer block (A2a), radical cross-linking must be made under an added condition. Namely, as stated above, radical cross-linking progresses through that radicals themselves formed by drawing-out by heating or radicals of the hydrogen atom bonded to the carbon atom at the 1-position of the alkyl group bonded to the aromatic ring of the aromatic vinyl compound unit are bonded mutually. Therefore, in this embodiment, the carbon atom at the 1-position of the alkyl group bonded to the aromatic ring of the aromatic vinyl compound unit of polymer block (A1) or polymer block (A2a) needs to have at least one hydrogen atom bonded thereto.

Embodiment 3 in Relation to Embodiment 1

More specifically, in the case of radical cross-linking, polymer block (A1) in Embodiment 1 needs to be a polymer block (A1') having as a main unit an aromatic vinyl compound unit represented by the following general formula (I') included in the aforementioned general formula (I)

wherein $Ar^{1A}$ represents an aryl group having 6 to 14 carbon atoms which is substituted with one alkyl group having 1 to 8 carbon atoms and can further have one or two alkyl groups each having 1 to 4 carbon atoms, but at least one of these alkyl groups is an alkyl group wherein at least one hydrogen atom is bonded to the carbon atom at the 1-position, and W represents a hydrogen atom, an alkyl group having 1 to 4 carbon atoms or an aryl group having 6 to 14 carbon atoms which may have 1 to 3 substituents, and is preferably a polymer block having as a main unit an aromatic vinyl compound unit represented by the following general formula (Ia') included in the aforementioned general formula (Ia)

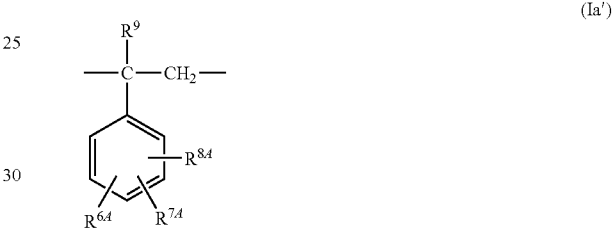

wherein $R^{6A}$ to $R^{8A}$ represent, respectively independently, hydrogen atoms or alkyl groups each having 1 to 4 carbon atoms, but at least one of them is an alkyl group having 1 to 4 carbon atoms, and, further, at least one of the alkyl groups is an alkyl group wherein at least one hydrogen atom is bonded to the carbon atom at the 1-position, and $R^9$ represents an hydrogen atom, an alkyl group having 1 to 4 carbon atoms or a phenyl group.

In the above, $R^1$ and $R^9$ have the same meanings as in the general formulae (I) and (Ia), respectively. Further, examples and preferred examples of $Ar^{1A}$ and its substituent(s) and examples and preferred examples of the alkyl groups in $R^{6A}$ to $R^{8A}$ are the same as those of $Ar^1$ and its substituent(s) and the alkyl groups in $R^6$ to $R^8$, provided that, as to the alkyl groups, the condition is met that "at least one of these alkyl groups is an alkyl group wherein at least one hydrogen atom is bonded to the carbon atom at the 1-position".

Further, just similarly as in polymer block (A1) in Embodiment 1, polymer block (A1') can contain an aromatic vinyl compound unit other than the aromatic vinyl compound unit represented by the general formula (I') and/or a monomer unit other than aromatic vinyl compound units, and the proportion of the aromatic vinyl compound unit represented by the general formula (I') in polymer block (A1') can be the same as the proportion of the aromatic vinyl compound unit represented by the general formula (I) in polymer block (A1). Furthermore, the molecular weight of polymer block (A1') can be the same as that of polymer block (A1).

Embodiment 3 in relation to Embodiment 2

In relation to Embodiment 2, in the case of radical cross-linking, polymer block (A2a) in Embodiment 2 needs to be a polymer block (A2a') having as a main unit an aromatic vinyl compound unit represented by the following general formula (II') included in the aforementioned general formula (II)

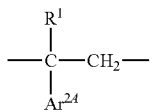

(II')

wherein $Ar^{2A}$ represents an aryl group having 6 to 14 carbon atoms which can have 1 to 3 substituents, but at least one of the substituents is an alkyl group having 1 to 4 carbon atoms wherein at least one hydrogen atom is bonded to the carbon atom at the 1-position, and $R^1$ represents a hydrogen atom, an alkyl group having 1 to 4 carbon atoms or an aryl group having 6 to 14 carbon atoms which may have 1 to 3 substituents,
and is preferably a polymer block having as a main unit an aromatic vinyl compound unit represented by the following general formula (IIa') included in the aforementioned general formula (IIa)

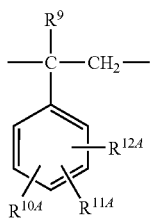

(IIa')

wherein $R^{10A}$ to $R^{12A}$ represent, respectively independently, hydrogen atoms or alkyl groups each having 1 to 4 carbon atoms, but at least one of $R^{10A}$ to $R^{12A}$ is an alkyl group having 1 to 4 carbon atoms wherein at least one hydrogen atom is bonded to the carbon atom at the 1-position, and $R^9$ represents an hydrogen atom, an alkyl group having 1 to 4 carbon atoms or a phenyl group.

In the above, $R^1$ and $R^9$ have the same meanings as in the general formulae (II) and (IIa), respectively. Further, examples and preferred examples of $Ar^{2A}$ and its substituent(s) and examples and preferred examples of the alkyl groups in $R^{10A}$ to $R^{12A}$ are the same as those of $Ar^2$ and its substituent(s) and the alkyl groups in $R^{10}$ to $R^{12}$, provided that, as to the alkyl groups, the condition is met that "at least one of these alkyl groups is an alkyl group wherein at least one hydrogen atom is bonded to the carbon atom at the 1-position".

Further, just similarly as in polymer block (A2a) in Embodiment 2, polymer block (A2a') can contain a monomer unit other than aromatic vinyl compound units, and the proportion of the aromatic vinyl compound unit represented by the general formula (II') in polymer block (A2a') can be the same as the proportion of the aromatic vinyl compound unit represented by the general formula (II) in polymer block (A2a). Furthermore, the molecular weight of polymer block (A2a') can be the same as that of polymer block (A2a).

Polymer Block (B)

The block copolymer used in the polymer electrolyte membrane of the invention has, besides polymer block (A), a polymer block (B) which forms a flexible phase. Polymer block (A) and polymer block (B) have a property that they mutually micro phase-separate and polymer block (A) themselves and polymer block (B) themselves gather, respectively, and since polymer block (A) has ion-conducting groups, ion channels are formed by gathering of polymer block (A) themselves to be paths for protons. By having such polymer block (B), the block copolymer takes on elasticity and becomes flexible as a whole, and in production of membrane electrode assemblies and polymer electrolyte fuel cells, moldability (assembling properties, bonding properties, fastening properties, etc.) is improved. Polymer block (B) forming a flexible phase herein referred to is a so-called rubber-like polymer block having a glass transition point or softening point of 50° C. or less, preferably 20° C. or less and more preferably 10° C. or less.

As monomers capable of forming a unit composing polymer block (B) forming a flexible phase, there can be mentioned alkenes each having 2 to 8 carbon atoms, cycloalkenes each having 5 to 8 carbon atoms, vinylcycloalkenes each having 7 to 10 carbon atoms, conjugated dienes each having 4 to 8 carbon atoms and conjugated cycloalkadienes each having 5 to 8 carbon atoms; vinylcycloalkenes each having 7 to 10 carbon atoms, conjugated dienes each having 4 to 8 carbon atoms and conjugated cycloalkadienes each having 5 to 8 carbon atoms in which vinylcycloalkenes, conjugated dienes and cycloalkadienes, part or all of carbon-carbon double bonds are hydrogenated; (meth)acrylic esters (methyl (meth)acrylate, ethyl(meth)acrylate, butyl(meth)acrylate, etc.); vinyl esters (vinyl acetate, vinyl propionate, vinyl butyrate, vinyl pivalate, etc.); vinyl ethers (methyl vinyl ether, isobutyl vinyl ether, etc.); etc., and they can be used alone or in a combination of two or more. The form of copolymerization in the case where two or more of them are copolymerized may be random copolymerization, block copolymerization, graft copolymerization or tapered copolymerization. When a monomer used in the (co)polymerization has two carbon-carbon double bonds, any of them can be used in the polymerization, and in the case of a conjugated diene either of 1,2-bond and 1,4-bond can be used in the polymerization, and so long as the glass transition point or softening point is 50° C. or less, there is no particular restriction on the proportion between 1,2-bond and 1,4-bond.

When the unit constituting polymer block (B) has a carbon-carbon double bond as in a vinylcycloalkene unit, a conjugated diene unit or a conjugated cycloalkadiene unit, it is preferred that 30% by mol or more of the carbon-carbon double bonds is hydrogenated, it is further preferred that 50% by mol or more thereof is hydrogenated, and it is still further preferred that 80% by mol or more thereof is hydrogenated, in view of enhancement of the power generation performance, heat deterioration resistance, etc. of membrane electrode assemblies using the polymer electrolyte membrane of the invention. The proportion of hydrogenation of the carbon-carbon double bonds can be calculated according to a method generally used, for example, a method of measuring iodine number, $^1$H-NMR measurement, or the like.

In view of giving elasticity, and thus good moldability, in production of membrane electrode assemblies and polymer electrolyte fuel cells, to block copolymers to be obtained, polymer block (B) is preferably a polymer block comprising at least one unit selected from an alkene unit having 2 to 8 carbon atoms; a cycloalkene unit having 5 to 8 carbon atoms, a vinylcycloalkene unit having 7 to 10 carbon atoms; a conjugated diene unit having 4 to 8 carbon atoms, a conjugated cycloalkadiene unit having 5 to 8 carbon atoms; a vinycycloalkenes unit having 7 to 10 carbon atoms wherein part or all of the carbon-carbon double bonds are hydrogenated; a conjugated diene unit having 4 to 8 carbon atoms wherein part or all of the carbon-carbon double bonds are hydrogenated; and a conjugated cycloalkadiene unit having 5 to 8 carbon atoms wherein part or all of the carbon-carbon double bonds are hydrogenated. From the above viewpoint, polymer block (B) is more preferably a polymer block comprising at least one unit selected from an alkene unit having 2 to 8 carbon atoms; a conjugated diene unit having 4 to 8 carbon atoms; and a conjugated diene unit having 4 to 8 carbon atoms wherein part or all of the carbon-carbon double bonds are hydrogenated. From the above viewpoint, polymer block (B) is still more preferably a polymer block comprising at least one unit selected from an alkene unit having 2 to 6 carbon atoms; a conjugated diene unit having 4 to 8 carbon atoms; and a conjugated diene unit having 4 to 8 carbon atoms wherein part or all of the carbon-carbon double bonds are hydrogenated. In the above, most preferably as the alkene unit is an isobutene unit, and most preferably as the conjugated diene unit is a 1,3-butadiene unit and/or an isoprene unit.

In the above, alkenes having 2 to 8 carbon atoms include ethylene, propylene, 1-butene, 2-butene, isobutene, 1-pentene, 2-pentene, 1-hexene, 2-hexene, 1-heptene, 2-heptene, 1-octene, 2-octene, etc.; cycloalkenes having 5 to 8 carbon atoms include cyclopentene, cyclohexene, cycloheptene and cyclooctene; vinylcycloalkenes having 7 to 10 carbon atoms include vinylcyclopentene, vinylcyclohexene, vinylcycloheptene, vinylcyclooctene, etc.; conjugated dienes having 4 to 8 carbon atoms include 1,3-butadiene, 1,3-pentadiene, isoprene, 1,3-hexa diene, 2,4-hexa diene, 2,3-dimethyl-1,3-butadiene, 2-ethyl-1,3-butadiene, 1,3-heptadiene, 1,4-heptadiene, 3,5-heptadiene, etc.; and conjugated cycloalkadienes having 5 to 8 carbon atoms include cyclopentadiene, 1,3-cyclohexadiene, etc.

Polymer block (B) can contain, besides the above monomer unit(s), another monomer unit, for example a unit of an aromatic vinyl compound such as styrene or vinylnaphthalene or a halogen-containing vinyl compound such as vinyl chloride, so long as it does not spoil the purposes of polymer block (B) of giving elasticity to the block copolymer. In this case, the form of the copolymerization of the above monomer with another monomer needs to be random copolymerization. The use amount of such another monomer is preferably less than 50% by mass, more preferably less than 30% by mass, still more preferably less than 10% by mass, based on the total of the above monomer and said another monomer.

Arrangement and Proportion of Each Polymer Block in the Block Copolymer and the Molecular Weight of the Block Copolymer As to arrangement of polymer block (A) (including A1, or A2a and A2b) and polymer block (B) in the block copolymer used in the invention, the number of each polymer block may be one or plural, and, further, the structure and/or molecular weight of respective polymer blocks may be the same or different. It is not always necessary that the respective polymer blocks are bonded linearly, and such a form that some polymer block is graft-bonded is also included. In this sense, the block copolymer used in the invention includes a graft copolymer.

In the case of the basic embodiment or Embodiment 1 or cross-linking in Embodiment 1 (Embodiment 3) of the invention, arrangement of polymer block (A1) and polymer block (B) in the block copolymer is not particularly limited, and, as examples, there can be mentioned an A1-B-A1 triblock copolymer, a B-A1-B triblock copolymer, a mixture of an A1-B-A1 triblock copolymer or a B-A1-B triblock copolymer with an A1-B diblock copolymer, an A1-B-A1-B tetrablock copolymer, an A1-B-A1-B-A1 pentablock copolymer, a B-A1-B-A1-B pentablock copolymer, an (A1-B)$_n$X star-shaped copolymer (X represents the residue of a coupling agent), a (B-A1)$_n$X star-shaped copolymer (X represents the residue of a coupling agent), etc. These block copolymers can be used alone or in a combination of two or more.

In the case of Embodiment 2 or cross-linking in Embodiment 2 (Embodiment 3) of the invention, arrangement of polymer block (A2a), polymer block (A2b) and polymer block (B) is not particularly limited, and it is not always necessary that polymer block (A2a) and polymer block (A2b) are bonded, and polymer block (B) may get in between them.

The structure of a block copolymer composed of polymer block (A2a), polymer block (A2b) and polymer block (B) is not particularly limited, and, as examples, there can be mentioned an A2a-B-A2b triblock copolymer, an A2a-B-A2b-A2a tetrablock copolymer, an A2a-B-A2a-A2b tetrablock copolymer, a B-A2a-B-A2b tetrablock copolymer, an A2a-B-A2b-B tetrablock copolymer, an A2b-B-A2b-A2a tetrablock copolymer, an A2b-A2a-B-A2a-A2b pentablock copolymer, an A2b-B-A2a-B-A2b pentablock copolymer, an A2a-A2b-B-A2b-A2a pentablock copolymer, an A2a-A2b-B-A2a-A2b pentablock copolymer, an A2a-B-A2b-A2a-B pentablock copolymer, an A2a-B-A2b-A2a-A2b pentablock copolymer, an A2a-B-A2b-B-A2b pentablock copolymer, an A2a-B-A2a-B-A2b pentablock copolymer, an A2a-B-A2a-A2b-B pentablock copolymer, a B-A2a-B-A2a-A2b pentablock copolymer, a B-A2a-B-A2b-A2a pentablock copolymer, a B-A2a-B-A2b-B pentablock copolymer, an A2b-A2a-A2b-B-A2b pentablock copolymer, etc.

In the case of Embodiment 2 or cross-linking in Embodiment 2 (Embodiment 3), the mass ratio of polymer block (A2b) to polymer block (B) is preferably 95:5 to 5:95, more preferably 90:10 to 10:90 and still further preferably 85:15 to 15:85, in view of dimensional stability, shape and form stability and durability.

In the block copolymer composing the polymer electrolyte membrane of the invention, the mass ratio of polymer block (A) (polymer block (A1) in the case of Embodiment 1 or cross-linking in Embodiment 1 (Embodiment 3); the sum of polymer block (A2a) and polymer block (A2b) in the case of Embodiment 2 or cross-linking in Embodiment 2 (Embodiment 3)) to polymer block (B) is preferably 90:10 to 10:90, more preferably 85:15 to 15:85 and still further preferably 80:20 to 20:80, in view of giving flexibility or elasticity and thus good moldability in production of membrane electrode assemblies and polymer electrolyte fuel cells.

The number average molecular weight of the block copolymer constituting polymer electrolyte membrane of the invention, in a state that an ion-conducting group is not introduced, is not particularly limited, but, usually, is preferably 10,000 to 2,000,000, more preferably 15,000 to 1,000,000 and still more preferably 20,000 to 500,000 as number average molecular weight in terms of polystyrene.

Ion-Conducting Group and Position of its Introduction

The block copolymer constituting the polymer electrolyte membrane of the invention needs to have ion-conducting groups in polymer block (A), and, as to preferred embodiments, in polymer block (A1) in Embodiment 1 and Embodiment 3 in the form of Embodiment 1 of the invention and in polymer block (A2a) in Embodiment 2 and Embodiment 3 in the form of Embodiment 2.

When ion conductivity is referred to in the invention, the ion includes protons, etc. The ion-conducting groups are not particularly limited so long as they are such groups that a membrane electrode assembly produced using the polymer electrolyte membrane can display sufficient ion conductivity, but above all, a sulfonic acid group or a phosphonic acid group or their salts represented by —SO$_3$M or —PO$_3$HM wherein M represents a hydrogen atom, an ammonium ion or an alkali metal ion, can be used preferably. As the ion-conducting group, a carboxyl group or its salts can also be used. The reason why polymer block (A) is chosen as the site of introduction of ion-conducting groups is that introduction of ion-conducting groups is easy and formation of ion channels is made to be easy.

As to the position of introduction of an ion-conducting group into polymer block (A) (in preferred embodiments, polymer block (A1) or polymer block (A2a)), there is no particular restriction, and it can be introduced either into the aromatic vinyl compound unit as the main unit or into the afore-mentioned other monomer units, but in view of making formation of ion channels easy and inhibition of methanol crossover (a phenomenon that methanol as a fuel permeates the electrolyte membrane from one electrode side to the other electrode side) in direct methanol polymer electrolyte fuel cells, it is preferred to introduce the ion-conducting group into the aromatic ring of the aromatic vinyl compound unit.

In the invention, ion-conducting groups exist substantially only in polymer block (A) (in preferred embodiments, polymer block (A1) or polymer block (A2a)). This is for making formation of ion channels easy, and, in Embodiment 2 and Embodiment 3 in the form of Embodiment 2, in addition to this, for drastically inhibiting change in structure of the ion channels after long-time power generation by substantially limiting the site of formation of ion channels to polymer block (A2a) and making polymer block (A2b) substantially function as a restraining phase. When the ion channels become large by structure change, there arises a tendency that methanol is liable to permeate and power generation efficiency becomes lower.

In the invention, the wording that ion-conducting groups exist substantially only in polymer block (A) is assumed to have the following meaning. Namely, in the basic/comprehensive embodiment, Embodiment 1 and Embodiment 3 in the form of Embodiment 1, the wording is assumed to mean that 95% by mol or more of ion-conducting groups existing in the block copolymer exist in polymer block (A) or polymer block (A1). In Embodiment 2 and Embodiment 3 in the form of Embodiment 2, the wording is assumed to mean that, when polymer block (A2b) has as a main unit an aromatic vinyl compound unit represented by the general formula (III) and the sum of the carbon atoms of $R^2$ to $R^4$ is 1 to 3, 60% by mol or more or preferably 70% by mol or more of ion-conducting groups existing in the block copolymer exist in polymer block (A2a); when polymer block (A2b) has as a main unit an aromatic vinyl compound unit represented by the general formula (III) and the sum of the carbon atoms of $R^2$ to $R^4$ is 4 or more, 75% by mol or more or preferably 90% by mol or more of ion-conducting groups existing in the block copolymer exist in polymer block (A2a); and when polymer block (A2b) is a crystalline polyolefin block, 95% by mol or more of ion-conducting groups existing in the block copolymer exist in polymer block (A2a).

The amount of ion-conducting groups introduced is important for determining the performance of the polymer electrolyte membrane. In order to display sufficient ion conductivity to use the polymer electrolyte membrane of the invention as a polymer electrolyte membrane for polymer electrolyte fuel cells, the ion exchange capacity of the polymer electrolyte membrane of the invention is preferably 0.30 meq/g or more, and more preferably 0.35 meq/g or more. As to the upper limit of the ion exchange capacity, since the ion exchange capacity becomes too large, a tendency occurs that hydrophilicity increases and the polymer electrolyte membrane easily swells, and it is preferred that the ion exchange capacity is 3.0 meq/g or less.

Processes for Producing Block Copolymers

The block copolymer used in the invention can be obtained mainly according to the following two production processes. Namely, they are (1) a process which comprises producing a block copolymer not having ion-conducting groups and then bonding an ion-conducting group, and (2) a process which comprises producing a block copolymer using a monomer having an ion-conducting group.

Production Process Wherein an Ion-Conducting Group is Bonded Later

<Production Process for a Block Copolymer in Embodiment 1 or Embodiment 3 in the Form of Embodiment 1>

Depending on the kind, molecular weight, etc. of monomer(s) constituting polymer block (A1) or (B), the process for producing polymer block (A1) or (B) is appropriately chosen from a radical polymerization method, an anionic polymerization method, a cationic polymerization method, a coordination polymerization method and so on, but in view of industrial easiness, a radical polymerization method, an anionic polymerization method or a cationic polymerization method is preferably chosen. Particularly, in view of molecular weight, molecular weight distribution, the structure of the polymer, easiness of bond to polymer block (B) or (A) and so on, a so-called living polymerization method is preferred, and, specifically, a living radical polymerization method, a living anionic polymerization method or a living cationic polymerization method is preferred.

Described below as specific examples of the production process are, a process for producing a block copolymer having its components a polymer block (A1) having as a main unit an aromatic vinyl compound unit whose α-carbon is tertiary carbon, such as a p-methylstyrene unit, and a polymer block (B) composed of a conjugated diene unit such as a butadiene unit; a process for producing a block copolymer having its components a polymer block (A1) having as a main unit an aromatic vinyl compound unit whose α-carbon is tertiary carbon, such as a p-methylstyrene unit, and a polymer block (B) composed of an alkene unit such as an isobutene unit; a process for producing a block copolymer having its components a polymer block (A1) having as a main unit an aromatic vinyl compound unit whose α-carbon is quaternary carbon, such as an α,p-dimethylstyrene unit, and a polymer block (B) composed of a conjugated diene unit such as a butadiene unit; and a process for producing a block copolymer having its components a polymer block (A1) having as a main unit an aromatic vinyl compound unit whose α-carbon is quaternary carbon, such as an α,p-dimethylstyrene unit, and a polymer block (B) composed of an alkene unit such as an isobutene unit. In these occasions, in view of industrial easiness, molecular weight, molecular weight distribution, easiness of bond between polymer block (A1) and polymer block (B) and so on, it is preferred to produce such a block copolymer according to a living anionic polymerization method or a living cationic polymerization method, and specific examples of synthesis as below are shown.

In production of a block copolymer constituting the polymer electrolyte membrane of the invention according to anionic polymerization, when an aromatic vinyl compound unit whose α-carbon is tertiary carbon, such as a p-methylstyrene unit is used as a main unit of polymer block (A1), a known process can be adopted/applied such as (1) a process of obtaining an A1-B-A1 block copolymer by polymerizing an aromatic vinyl compound whose α-carbon is tertiary carbon, such as p-methylstyrene, in a cyclohexane solvent under a temperature condition of 20 to 100° C. using an anionic polymerization initiator, then polymerizing a conjugated diene, and successively polymerizing an aromatic vinyl compound whose α-carbon is tertiary carbon, such as p-methylstyrene, or (2) a process of obtaining an A1-B-A1 block copolymer by polymerizing an aromatic vinyl compound whose α-carbon is tertiary carbon, such as p-methylstyrene, in a cyclohexane solvent under a temperature condition of 20 to 100° C. using an anionic polymerization initiator, then polymerizing a conjugated diene, and adding a coupling agent such as phenyl benzoate.

In production of a block copolymer constituting the polymer electrolyte membrane of the invention according to anionic polymerization, when an aromatic vinyl compound unit whose α-carbon is quaternary carbon, such as an α,p-dimethylstyrene unit is used as a main unit of polymer block (A1), such a block copolymer can be produced applying a known process such as (3) a process of obtaining an A1-B-A1 block copolymer by polymerizing α-methylstyrene of a concentration of 5 to 50% by mass in a nonpolar solvent in the presence of a polar compound of a concentration of 0.1 to 10% by mass at a temperature of −30° C. to 30° C. using an organic lithium compound as an initiator, polymerizing a conjugated diene with the resulting living polymer, and then adding a coupling agent such as phenyl benzoate.

In production of a block copolymer constituting the polymer electrolyte membrane of the invention according to cationic polymerization, when an aromatic vinyl compound unit whose α-carbon is tertiary carbon, such as a p-methylstyrene unit is used as a main unit of polymer block (A1), such a block copolymer can be produced applying a known process using styrene such as (4) a process of obtaining an A1-B-A1 block copolymer by cationically polymerizing isobutene in a mixed solvent of a halogenated hydrocarbon and a hydrocarbon in the presence of a Lewis acid at a temperature of −78° C. using a bifunctional halide initiator, and then polymerizing styrene (Macromol. Chem., Macromol. Symp. 32, 119 (1990)).

In production of a block copolymer constituting the polymer electrolyte membrane of the invention according to cationic polymerization, when an aromatic vinyl compound unit whose α-carbon is quaternary carbon, such as an α,p-dimethylstyrene unit is used as a main unit of polymer block (A1), such a block copolymer can be produced applying a known process such as (5) a process of obtaining an A1-B-A1 block copolymer by cationically polymerizing isobutene in a mixed solvent of a halogenated hydrocarbon and a hydrocarbon in the presence of a Lewis acid at a temperature of −78° C. using a bifunctional halide initiator, making diphenylethylene add, further adding the Lewis acid, and then polymerizing α-methylstyrene (Macromolecules, (1995) 28, 4893-4898).

<Production Process for a Block Copolymer in Embodiment 2 or Embodiment 3 in the Form of Embodiment 2>

Depending on the kind, molecular weight, etc. of monomer(s) constituting polymer block (A2a), (A2b) or (B), the process for producing polymer block (A2a), (A2b) or (B) is appropriately chosen from a radical polymerization method, an anionic polymerization method, a cationic polymerization method, a coordination polymerization method and so on, but in view of industrial easiness, a radical polymerization method, an anionic polymerization method or a cationic polymerization method is preferably chosen. Particularly, in view of molecular weight, molecular weight distribution, the structure of the polymer, easiness of bond among polymer blocks (A2a), (A2b) and (B) and so on, a so-called living polymerization method is preferred, and, specifically, a living radical polymerization method, a living anionic polymerization method or a living cationic polymerization method is preferred.

As a specific example of the production process, a process for producing a block copolymer having its components a polymer block (A2b) having as a main unit an aromatic vinyl compound unit such as a 4-tert-butylstyrene unit, a polymer block (A2a) composed of a styrene unit or an α-methylstyrene unit and a polymer block (B) composed of a conjugated diene unit is described. In this occasion, in view of industrial easiness, molecular weight, molecular weight distribution, easiness of bond among polymer blocks (A2a), (B) and (A2b) and so on, it is preferred to produce such a block copolymer according to a living anionic polymerization method or a living cationic polymerization method, and specific examples of synthesis as below are shown.

In production of a block copolymer or graft copolymer constituting the polymer electrolyte membrane of the invention by anionic polymerization, there can be adopted/applied (1) a process of obtaining an A2a-B-A2b block copolymer by polymerizing an aromatic vinyl compound such as 4-tert-butylstyrene in a cyclohexane solvent under a temperature condition of 10 to 100° C. using an anionic polymerization initiator, and then successively polymerizing a conjugated diene and styrene, (2) a process of obtaining an A2b-A2a-B-A2a-A2b block copolymer by polymerizing an aromatic vinyl compound such as 4-tert-butylstyrene in a cyclohexane solvent under a temperature condition of 10 to 100° C. using an anionic polymerization initiator, then successively polymerizing styrene and a conjugated diene, and then adding a coupling agent such as phenyl benzoate, (3) a process of obtaining an A2b-B(-g-A2a)-A2b block graft copolymer by successively polymerizing an aromatic vinyl compound such as 4-tert-butylstyrene, a conjugated diene and an aromatic vinyl compound such as 4-tert-butylstyrene in a cyclohexane solvent under a temperature condition of 10 to 100° C. using an anionic polymerization initiator, to form an A2b-B-A2b block copolymer, adding an anionic polymerization initiator system (an anionic polymerization initiator/N,N,N',N'-tetramethylethylenediamine) to lithiate the resulting conjugated diene unit, and then polymerizing styrene, (4) a process of obtaining an A2a-B-A2b block copolymer by polymerizing α-methylstyrene of a concentration of 5 to 50% by mass in a nonpolar solvent in the presence of a polar compound of a concentration of 0.1 to 10% by mass at a temperature of −30° C. to 30° C. using an organic lithium compound as an initiator, and then successively polymerizing a conjugated diene and an aromatic vinyl compound such as 4-tert-butylstyrene with the resulting living polymer, (5) a process of obtaining an A2a-A2b-B-A2b-A2a block copolymer by polymerizing α-methylstyrene of a concentration of 5 to 50% by mass in a nonpolar solvent in the presence of a polar compound of a concentration of 0.1 to 10% by mass at a temperature of −30° C. to 30° C. using an organic lithium compound as an initiator, successively polymerizing an aromatic vinyl compound such as 4-tert-butylstyrene and a conjugated diene with the resulting living polymer, and then adding a coupling agent such as phenyl benzoate, etc.

In production of a block copolymer constituting the polymer electrolyte membrane of the invention by cationic polymerization, there can be adopted/applied (6) a process of obtaining an A2b-A2a-B-A2a-A2b block copolymer by cationically polymerizing isobutene in a mixed solvent of a halogenated hydrocarbon and a hydrocarbon in the presence of a Lewis acid at a temperature of −78° C. using a bifunctional halide initiator, and then successively polymerizing styrene and a styrene derivative such as 4-tert-butylstyrene.

<Introduction of an Ion-Conducting Group>

Processes for bonding an ion-conducting group to the resulting block copolymer is described below.

First, a process for introducing a sulfonic acid group into the resulting block copolymer is described. Sulfonation can be conducted by a known sulfonation method. As such a method, there can be exemplified a process of preparing a solution or suspension of the block copolymer in an organic solvent, and then adding a sulfonating agent and conducting mixing, a process of directly adding a gaseous sulfonating agent to the block copolymer, and the like.

As the sulfonating agent to be used, there can be exemplified sulfuric acid, a mixture system of sulfuric acid and an aliphatic acid anhydride, chlorosulfonic acid, a mixture system of chlorosulfonic acid and trimethylsilyl chloride, sulfur trioxide, a mixture system of sulfur trioxide and triethyl phosphate, and, further, an aromatic organic sulfonic acid represented by 2,4,6-trimethylbenzenesulfonic acid, and so on. Further, as the organic solvent to be used, there can be exemplified a halogenated hydrocarbon such as methylene chloride, a straight-chain aliphatic hydrocarbon such as hexane, a cyclic aliphatic hydrocarbon such as cyclohexane, and so on, and they can be used also with an appropriate selection from plural combinations thereof, if necessary.

Next, a process for introducing a phosphonic acid group into the resulting block copolymer is described. Phosphonation can be conducted by a known phosphonation method. Specifically, there can, for example, be mentioned a process of preparing a solution or suspension of the block copolymer in an organic solvent, reacting the copolymer with chloromethyl ether or the like in the presence of anhydrous aluminum chloride to introduce halomethyl groups into the aromatic rings, reacting the resulting copolymer with phosphorus trichloride and anhydrous aluminum chloride added, and then conducting hydrolysis reaction to introduce phosphonic acid groups; and so on. There can further be exemplified a process of adding phosphorus trichloride and anhydrous aluminum chloride to the copolymer and reacting them to introduce phosphinic groups into the aromatic rings, and then oxidizing the phosphinic groups into phosphonic groups with nitric acid; and so on.

As to the degree of sulfonation or phosphonation, as already stated above, sulfonation or phosphonation is made so that the ion exchange capacity of the polymer electrolyte membrane of the invention becomes preferably 0.30 meq/g or more and more preferably 0.35 meq/g or more, but 3.0 meq/g or less. By this more practical ion conduction performance can be obtained. The ion exchange capacity of a polymer electrolyte membrane finally obtained, the ion exchange capacity of sulfonated or phosphonated block copolymers, and the sulfonation proportion or phosphonation proportion in polymer blocks (A) in block copolymers (polymer block (A1) in Embodiment 1 or Embodiment 3 in the form of Embodiment 1; polymer block (A2a) in Embodiment 2 or Embodiment 3 in the form of Embodiment 2) can be calculated using analytical method(s) such as an acid value titration method, infrared spectroscopy, measurement of nuclear magnetic resonance spectrum ($^1$H-NMR spectrum) and/or the like.

Process for Production of a Block Copolymer Using a Monomer Having an Ion-Conducting Group The second process for producing a block copolymer used in the invention is a process of producing the block copolymer using at least one monomer having an ion-conducting group.

As the monomer having an ion-conducting group, a monomer wherein an ion-conducting group is bonded to an aromatic vinyl compound is preferred. Specifically, there can be mentioned o, m or p-alkylstyrenesulfonic acids, α-alkyl-o, m or p-alkylstyrenesulfonic acids, styrenesulfonic acid, α-alkyl-styrenesulfonic acids, α-alkyl-vinylnaphthalenesulfonic acids, α-alkyl-vinylanthracenesulfonic acids, α-alkyl-vinylpyrenesulfonic acids, o, m or p-alkylstyrenephosphonic acids, α-alkyl-o,m or p-alkylstyrenephosphonic acids, styrenephosphonic acid, α-alkylstyrenephosphonic acids, α-alkylvinylnaphthalenephosphonic acids, α-alkylvinylanthracenephosphonic acids, α-alkylvinylpyrenephosphonic acids, etc.

As the monomer having an ion-conducting group, a monomer wherein an ion-conducting group is bonded to a conjugated diene compound can also be used. Specifically, there can be mentioned 1,3-butadiene-1-sulfonic acid, 1,3-butadiene-2-sulfonic acid, isoprene-1-sulfonic acid, isoprene-2-sulfonic acid, 1,3-butadiene-1-phosphonic acid, 1,3-butadiene-2-phosphonic acid, isoprene-1-phosphonic acid, isoprene-2-phosphonic acid, etc.

As the monomer having an ion-conducting group, there can also be used vinylsulfonic acid, α-alkyl-vinylsulfonic acids, vinylalkylsulfonic acids, α-alkyl-vinylalkylsulfonic acids, vinylphosphonic acid, α-alkyl-vinylphosphonic acids, vinylalkylphosphonic acids, α-alkyl-vinylalkylphosphonic acids, etc.

As the monomer having an ion-conducting group, there can further be used a (meth)acrylic monomer to which an ion-conducting group is bonded. Specifically, methacrylic acid, acrylic acid, 2-acrylamido-2-methyl-1-propanesulfonic acid, etc. can be mentioned.

The ion-conducting group can be introduced in the form of a salt neutralized with a proper metal ion (e.g., an alkali metal ion) or a counter ion (e.g., an ammonium ion). For example, by producing a polymer using sodium o, m or p-alkylstyrenesulfonate or sodium α-methyl-o, m or p-alkylstyrenesulfonate, a desired ion-conducting group can be introduced. A block copolymer wherein the sulfonic acid group is converted to a salt form can also be obtained by ion exchange using a suitable method.

Optional Ingredients Capable of Constituting the Polymer Electrolyte Membrane

The polymer electrolyte membrane of the invention can, if necessary, contain, in addition to the block copolymer, a softening agent, in such a range that the effects of the invention are not spoiled. As the softening agent, there are petroleum-type softening agents such as paraffin-, naphthene- or aroma-process oils; paraffins; vegetable oil-type softening agents; plasticizers; etc., and they can be used alone or in a combination of two or more.

The polymer electrolyte membrane of the invention can, if necessary, further contain, in such a range that the effects of the invention are not spoiled, various additives, for example, phenol-type stabilizers, sulfur-type stabilizers, phosphorus-type stabilizers, light stabilizers, antistatic agents, mold release agents, flame retardants, foaming agents, pigments, dyes, brighteners, carbon fiber, etc. alone in a combination of two or more. As specific examples of the stabilizers, there can be mentioned phenol-type stabilizers such as 2,6-di-t-butyl-p-cresol, pentaerythrityl tetrakis[3-(3,5-di-t-butyl-4-hydroxyphenyl)propionate], 1,3,5-trimethyl-2,4,6-tris(3,5-di-t-butyl-4-hydroxybenzyl)benzene, octadecyl 3-(3,5-di-t-butyl-4-hydroxyphenyl)propionate, triethylene glycol bis[3-(3-t-butyl-5-methyl-4-hydroxyphenyl)propionate], 2,4-bis(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate], N,N'-hexamethylenebis(3,5-di-t-butyl-4-hydroxy-hydrocinnamide), 3,5-di-t-butyl-4-hydroxy-benzylphosphonate diethyl ester, tris-(3,5-di-t-butyl-4-hydroxybenzyl)isocyanurate and 3,9-bis{2-[3-(3-t-butyl-4-hydroxy-5-methylphenyl)propionyloxy]-1,1-dimethylethyl}-2,4,8,10-tetraoxaspiro[5,5]undecane; sulfur-type stabilizers such as pentaerythrityl tetrakis(3-laurylthiopropionate), distearyl 3,3'-thiodipropionate, dilauryl 3,3'-thiodipropionate and dimyristyl 3,3'-thiodipropionate; phosphorus-type stabilizers such as tris(nonylphenyl)phosphite, tris (2,4-di-t-butylphenyl)phosphite, distearyl pentaerythritol diphosphite, bis(2,6-di-t-butyl-4-methylphenyl)pentaerythritol diphosphite; etc. These stabilizers can be used alone or in a combination of two or more.

The polymer electrolyte membrane of the invention can, if necessary, further contain, in such a range that the effects of the invention are not spoiled, an inorganic filler. As specific examples of the inorganic filler, there can be mentioned talc, calcium carbonate, silica, glass fiber, mica, kaolin, titanium oxide, montmorillonite, alumina, etc.

The content of the above-mentioned block copolymer in the polymer electrolyte membrane of the invention is preferably 50% by mass or more, more preferably 70% by mass or more and further more preferably 90% by mass or more, in view of ion conductivity.

In view of performance, membrane strength, handling properties, etc. necessary as an electrolyte membrane for fuel cells, the thickness of the polymer electrolyte membrane of the invention is preferably on the order of 5 to 500 µm. When the membrane thickness is less than 5 µm, the mechanical strength of the membrane and the barrier properties of a fuel such as a gas or methanol on the membrane tend to be insufficient. Conversely, when the membrane thickness goes beyond 500 µm and is too thick, the electric resistance of the membrane becomes large and sufficient proton conductivity is not attained, and as a result, the power generation characteristics of the cells tends to be lowered. The membrane thickness is more preferably 10 to 300 µm.

Process for Preparation of the Polymer Electrolyte Membrane

As to a process for preparing the polymer electrolyte membrane of the invention, any process can be adopted so long as it is a usual process for such preparation. For example, there can be used a process which comprises mixing a block copolymer constituting the polymer electrolyte membrane of the invention, or the block copolymer and additives as mentioned above with a suitable solvent to dissolve or suspend the block copolymer, casting the resulting solution or suspension onto a sheet material such as PET or glass or applying it on such a material using a coater, an applicator or the like, and then removing the solvent under an appropriate condition to obtain an electrolyte membrane having a desired thickness; a process of making a membrane using a known method such as hot press forming, roll thermoforming or extrusion molding; etc.

In Embodiment 3 of the invention, it is necessary to conduct cross-linking of polymer block (A1) or polymer block (A2a) in the block copolymer, and this cross-linking is, usually, conducted together with or after preparation of a polymer electrolyte membrane. Preparation of the polymer electrolyte membrane of the invention can, for example, be made by mixing a block copolymer having ion-conducting groups, constituting the polymer electrolyte membrane of the invention, and, according to necessity, a cross-linking agent such as a radical initiator or a polyfunctional monomer described below, and/or various additives as mentioned above with a suitable solvent to dissolve or suspend the block copolymer, casting the resulting solution or suspension onto a sheet material such as PET or glass or applying it on such a material using a coater, an applicator or the like, and then removing the solvent under an appropriate condition; or by melting and kneading the above mixture and then making a membrane using a known method such as hot press forming, roll thermoforming or extrusion molding.

It is also possible to build up a new layer on the obtained electrolyte membrane layer by applying a solution of a block copolymer which is the same or different thereon and then drying it. It is further possible to form a laminate by press-bonding the same or different electrolyte membranes obtained in the same way as mentioned above, by roll thermoforming or the like.

A solvent to be used in preparation of the polymer electrolyte membrane is not particularly restricted so long as it does not destroy the structure of the block copolymer and is capable of preparing a solution having a viscosity of the order to make its casting or application possible. Specifically, there can be exemplified halogenated hydrocarbons such as methylene chloride; aromatic hydrocarbons such as toluene, xylene and benzene; straight-chain aliphatic hydrocarbons such as hexane and heptane; cyclic aliphatic hydrocarbons such as cyclohexane; ethers such as tetrahydrofuran; and alcohols such as methanol, ethanol, propanol, isopropanol, butanol and isobutyl alcohol; and mixed solvents thereof, etc. According to the constitution, molecular weight, ion exchange capacity, etc. of the block copolymer, one or a combination of two or more can appropriately be chosen and used among the solvents exemplified above.

The condition of removal of the solvent used can optionally be chosen so long as it is a condition to make it possible to completely remove the solvent at a temperature lower than a temperature at which the ion-conducting groups such as sulfonic acid groups in the block copolymer constituting the polymer electrolyte membrane of the invention drop off. In order to attain desired physical properties, it is possible to combine plural temperatures optionally and/or combine conditions of under draft and under vacuum and so on optionally. Specifically, there can be exemplified a process of conducting preliminary drying under a vacuum condition of the order of room temperature to 60° C. for several hours and then conducting drying under a vacuum condition of 100° C. or more, preferably 100 to 120° C. for 12 hours or so to remove the solvent; a process of removing the solvent under a drying condition of under draft of 60 to 140° C. for the order of several minutes to several hours; etc., but processes for removal of the solvent are not limited thereto.

Cross-Linking

In Embodiment 3 of the invention, it is necessary that polymer block (A1) or (A2a) having ion-conducting groups, which is a constituent of the block copolymer constituting the polymer electrolyte membrane of the invention, is cross-linked. This cross-linking is made among polymer blocks (A1) or among polymer blocks (A2a). By introducing cross-linking among them, change in structure of ion channels formed is inhibited and the shape and form stability of the membrane is heightened. Further, change in structure of ion channels between before and after the treatment of immersion in a methanol solution is inhibited, and change of characteristics such as methanol permeability and ion conductivity is largely inhibited. As a result, the polymer electrolyte membrane can attain stable performance over a long time in polymer electrolyte fuel cells.

As means of cross-linking, there can be mentioned a method for cross-linking using a polyamine, a radical cross-linking method, etc. Regardless of what method is adopted, the degree of cross-linking is such a degree that change in methanol permeability and ion conductivity of the polymer electrolyte membrane between before and after the treatment with a methanol solution is significantly diminished.

The polyamine is not particularly limited so long as it is a polyamine having two or more primary, secondary and/or tertiary amino groups in one molecule, and there can be exemplified diamines such as ethylenediamine, trimethylenediamine, tetramethylenediamine, pentamethylenediamine and hexamethylenediamine; triamines such as iminobis(propylamine) and diethylenetriamine; etc. Cross-linking with a polyamine is conducted by reaction between ion-conducting groups and the polyamine. Thus, in the case of cross-linking with a polyamine, it is necessary that the ion exchange capacity of the polymer electrolyte membrane after the cross-linking meets the aforementioned requisite. This cross-linking usually progresses at ordinary temperature.

Cross-linking with a polyamine is not made or is made only partially at the time of preparation of the polymer electrolyte membrane and is made after preparation of the membrane. In the occasion, there can be adopted a process of immersing the resulting membrane in a polyamine solution to subject it to cross-linking reaction, washing it with a solvent as used in preparation of the membrane or water, and then drying it; etc.

Radical cross-linking can be conducted, when a block copolymer having ion-conducting groups and having a unit represented by the general formula (I) or a unit represented by the general formula (II), as an aromatic vinyl compound unit which is a main unit of polymer block (A1) or (A2a), is produced and then a polymer electrolyte membrane is produced, as mentioned above, using the block copolymer and, if necessary, a radical initiator or the like, or after the production thereof, by heating the production system or the resulting membrane. Radical cross-linking progresses through that, in the alkyl group having 1 to 8 carbon atoms wherein at least one hydrogen atom is bonded to the carbon atom at the 1-position, the alkyl group substituting $Ar^1$ of the general formula (I), or in the alkyl group having 1 to 4 carbon atoms wherein at least one hydrogen atom is bonded to the carbon atom at the 1-position, the alkyl group substituting $Ar^2$ of the general formula (II), the hydrogen atom is drawn out by heating and/or radicals) formed through decomposition of the radical initiator to form radicals, and the resulting radicals are mutually bonded; etc. As the radical initiator, there can be mentioned persulfate salts such as sodium persulfate and potassium persulfate; azo compounds such as azobisisobutyronitrile; peroxides such as benzoyl peroxide and 1,1-bis(tert-butylperoxy)cyclohexane; etc. The radical initiator can be used in an amount of 5 equivalents or less, preferably 0.01 to 1 equivalent per 1 mol of the unit represented by the general formula (I) or (II). As the polyfunctional monomer, there can be used trially isocyanurate, etc. This cross-linking can be carried out at a temperature of the order of 60 to 220° C., preferably of the order of 80 to 180° C., by hot pressing or the like.

Membrane Electrode Assembly

A membrane electrode assembly using the polymer electrolyte membrane of the invention is described below. As to production of the membrane electrode assembly, there is no particular restriction, and a known process can be utilized. For example, there can be mentioned a process of applying a catalyst paste containing an ion-conducting binder onto a gas diffusion layer by a printing method or a spraying method and drying the paste to form a bonded product of the catalyst layer and the gas diffusion layer, and then bonding a pair of the bonded products, with each catalyst layer being made to be inside, to both sides of the polymer electrolyte membrane by a hot press or the like; or a process of applying the catalyst paste onto both sides of the polymer electrolyte membrane by a printing method or a spraying method and drying the paste to form a catalyst layer, and then compression-bonding a gas diffusion layer onto each catalyst layer by a hot press or the like. As still another production process, there is a process of applying a solution or suspension containing an ion-conducting binder onto both sides of the polymer electrolyte membrane and/or onto the surfaces of the catalyst layers in a pair of gas diffusion electrodes, sticking the electrolyte membrane and the surfaces of the catalyst layers together, and then bonding them by thermocompression bonding or the like. In this case, the solution or suspension can be applied onto any one or both of the electrolyte membrane and the surfaces of the catalyst layers. As further still another production process, there is a process of applying the above catalyst paste onto a film substrate such as one made of polytetrafluoroethylene (PTFE) and drying the paste to form a catalyst layer, transferring a pair of the catalyst layers on the film substrates onto both sides of the polymer electrolyte membrane by thermocompression bonding, peeling off the film substrates to obtain a bonded product of the electrolyte membrane and the catalyst layers, and then compression-bonding a gas diffusion layer onto each catalyst layer by a hot press. In these methods, it is possible to conduct the above process in a state that the ion-conducting groups are made to a salt with a metal such as Na, and restore the proton type by acid treatment after the bonding.

As the ion-conducting binder constituting the membrane electrode assembly, there can, for example, be used an ion-conducting binder composed of an existing perfluorocarbon-sulfonic acid-type polymer such as "Nafion" (registered trade mark, made by Dupont Co.) or "Gore-select" (registered trade mark, made by Gore Co.); an ion-conducting binder composed of a sulfonated polyether sulfone or a sulfonated polyether ketone; an ion-conducting binder composed of a polybenzimidazole impregnated with phosphoric acid or sulfuric acid; or the like. It is also possible to make an ion-conducting binder from the block copolymer constituting the polymer electrolyte membrane of the invention. For further heightening the adhesion between the polymer electrolyte membrane and the gas diffusion electrode, it is preferred to use an ion-conducting binder made from a material the same as or analogous to that of the polymer electrolyte membrane.

As to the constitutive materials of the catalyst layer in the membrane electrode assembly, there is no particular restriction as an electrically conductive material/catalyst support, and, for example, a carbon material is mentioned. As the carbon material, there can be mentioned carbon blacks such as furnace black, channel black and acetylene black; activated carbon; graphite, etc., and these can be used alone or as a mixture of two or more. As the catalyst metal, any metal can be used so long as it is a metal which promotes oxidation reaction of the fuel such as hydrogen or methanol and reduction reaction of oxygen, and there can, for example, be mentioned platinum, gold, silver, palladium, iridium, rhodium, ruthenium, iron, cobalt, nickel, chromium, tungsten, manganese, etc., and their alloys such as a platinum-ruthenium alloy. Among them, platinum or a platinum alloy is used in many cases. The particle size of a metal as the catalyst is, usually, 10 to 300 angstroms. It is advantageous in view of costs to support such a catalyst on an electrically conductive material/catalyst support such as carbon because of less use amount of the catalyst. If necessary, it is possible to make the catalyst layer contain a water repellent. As the water repellent, there can, for example, be mentioned various thermoplastic resins such as polytetrafluoroethylene, polyvinylidene fluoride, a styrene-butadiene copolymer and a poly(ether ether ketone).

The gas diffusion layer of the membrane electrode assembly is composed of a material having electrical conductivity and gas permeability, and as the material, there can, for example, be mentioned a porous material composed of carbon fiber such as carbon paper or carbon cloth. Such a material can be subjected to water repellent treatment for heightening water repellency.

By inserting a membrane electrode assembly obtained by a process as mentioned above between electrically conductive separator materials having both roles of separation of the electrode chambers and as a path for supplying gas to the electrode, a polymer electrolyte fuel cell can be obtained. The membrane electrode assembly of the invention can be used as a membrane electrode assembly for polymer electrolyte fuel cells such as a pure hydrogen one using hydrogen as the fuel gas, a methanol-reforming one using hydrogen obtained by reforming methanol, a natural gas-reforming one using hydrogen obtained by reforming natural gas, a gasoline-reforming one using hydrogen obtained by reforming gasoline and a direct methanol one wherein methanol is used directly.

A fuel cell using the polymer electrolyte membrane of the invention is economical, mild to the environment and has not only high ion conductivity but a characteristic not easily to be influenced by methanol, and attains excellent power generation performance in polymer electrolyte fuel cells, particularly in direct methanol fuel cells.

Fuel cells using the polymer electrolyte membrane of Embodiment 1 are excellent particularly in methanol barrier properties. Since the polymer electrolyte membrane of Embodiment 2 has characteristics that change of the dimension and dynamic characteristics (tensile characteristics, etc.) between during a dry state and during a wet state is small, and, further, change of characteristics such as methanol permeability and ion conductivity between before and after treatment with a methanol solution is small, fuel cells using the membrane are excellent particularly in durability, and can be operated stably over a long time. The electrolyte membrane of Embodiment 2 also has a characteristic to be capable of attaining a certain characteristic immediately after the operation circumstance was changed between a dry state and a wet state, and is also excellent in starting properties. The polymer electrolyte membrane of Embodiment 3 particularly has a characteristic that change of characteristics such as methanol permeability and ion conductivity between before and after the treatment of immersion in a methanol solution is small, and, therefore, fuel cells using the membrane are excellent particularly in durability, and can be operated stably over a long time.

EXAMPLES

The present invention is further specifically described below through referential examples, examples and comparative examples, and performance tests as an electrolyte membrane for polymer electrolyte fuel cells (ion exchange capacity, membrane strength, ion conductivity of the membrane, electric resistance of the membrane, methanol permeation rate of the membrane, power generation performance of single cells for fuel cells) and results of the tests, but the invention is not limited thereto.

Embodiment 1 (Alkyl Substitution)

Referential Example 1-1

Production of a Block Copolymer Composed of Poly (p-Methylstyrene) (Polymer Block (A)) and Hydrogenated Polybutadiene (Polymer Block (B))

In a similar process to a previously reported process (JP-A-2005-281373), a poly(p-methylstyrene)-b-polybutadiene-b-poly(p-methylstyrene) (hereinafter abbreviated as pmSBpmS) was synthesized using, in synthesis of polymer block (A), p-methylstyrene as an aromatic vinyl compound and using, in synthesis of polymer block (B), butadiene. The number average molecular weight of the resulting pmSBpmS was 78,000, and, in the pmSBpmS, the amount of the 1,4-bond and the content of the p-methylstyrene unit determined by $^1$H-NMR measurement were 58.5% by mol and 30% by mass, respectively.

A solution of the synthesized pmSBpmS in cyclohexane was prepared, the solution was put in a pressure proof vessel whose inside atmosphere had sufficiently been replaced with nitrogen, and then, hydrogenation reaction was conducted at 50° C. for 7 hours in an atmosphere of hydrogen using a Ni/Al Ziegler hydrogenating catalyst to obtain a poly(p-methylstyrene)-b-hydrogenated polybutadiene-b-poly(p-methylstyrene) triblock copolymer (hereinafter abbreviated as pmSEBpmS). The hydrogenation proportion of the pmSEBpmS was calculated by $^1$H-NMR spectrum measurement to be 99.7%.

Referential Example 1-2

Production of a Block Copolymer Composed of Poly (Styrene/4-Tert-Butylstyrene) (Polymer Block (A)) and Hydrogenated Polyisoprene (Polymer Block (B))

In a similar process to a previously reported process (JP-A-2005-281373), a poly(styrene/4-tert-butylstyrene)-b-polyisoprene-b-poly(styrene/4-tert-butylstyrene) (hereinafter abbreviated as (S/tBS)I(S/tBS)) was synthesized using, in synthesis of polymer block (A), a mixture of 4-tert-butylstyrene and styrene in a mass ratio of 50/50 as aromatic vinyl compounds and using, in synthesis of polymer block (B), isoprene. The number average molecular weight of the resulting (S/tBS)I(S/tBS) was 51,800, and, in the (S/tBS)I(S/tBS), the amount of the 1,4-bond, the content of the styrene unit and the content of the 4-tert-butylstyrene unit determined by the $^1$H-NMR measurement were 94.0% by mol, 15.6% by mass and 15.6% by mass, respectively. The procedure of Referential example 1-1 was repeated except that the synthesized (S/tBS)I(S/tBS) was used and hydrogenation reaction was conducted for 9 hours, and, thereby, was obtained a poly (styrene/4-tert-butylstyrene)-b-hydrogenated polyisoprene-b-poly(styrene/4-tert-butylstyrene) (hereinafter abbreviated as (S/tBS)EP(S/tBS) with a hydrogenation proportion of 99.9%.

Example 1-1

(1) Synthesis of Sulfonated pmSEBpmS 51 g of the block copolymer obtained in Referential example 1-1 (pmSEBpmS) was vacuum dried for 1 hour in a glass-made reaction vessel equipped with a stirrer, the inside atmosphere of the reaction vessel was replaced with nitrogen, 658 ml of methylene chloride was added, and the mixture was stirred at 35° C. for 2 hours to dissolve the block copolymer. After the dissolution, a sulfonating reagent prepared by reacting 9.40 ml of acetic anhydride with 4.20 ml of sulfuric acid at 0° C. in 18.9 ml of methylene chloride was gradually added dropwise thereto over a period of 5 minutes. After stirring at 35° C. for 6 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated pmSEBpmS. The sulfonation proportion of the benzene rings of the p-methylstyrene units in the sulfonated pmSEBpmS was 29% by mol from $^1$H-NMR analysis.

(2) Production of an Electrolyte Membrane for Fuel Cells

A 5% by mass solution in THF of the sulfonated pmSEBpmS obtained in (1) was prepared, and the solution was cast on a polytetrafluoroethylene sheet at a thickness of about 1,000 μm, sufficiently dried at room temperature and then sufficiently vacuum dried to obtain a membrane of 52 μm thickness.

Example 1-2

(1) Synthesis of Sulfonated (S/tBS)EP(S/tBS)

30 g of the block copolymer obtained in Referential example 1-2 (S/tBS)EP(S/tBS) was vacuum dried for 1 hour in a glass-made reaction vessel equipped with a stirrer, the inside atmosphere of the reaction vessel was replaced with nitrogen, 30 ml of methylene chloride was added, and the mixture was stirred at 35° C. for 2 hours to dissolve the block copolymer. After the dissolution, a sulfonating reagent prepared by reacting 5.53 ml of acetic anhydride with 2.47 ml of sulfuric acid at 0° C. in 11.1 ml of methylene chloride was gradually added dropwise thereto over a period of 5 minutes. After stirring at 35° C. for 6 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated (S/tBS)EP(S/tBS). The sulfonation proportion of the benzene rings in the sulfonated (S/tBS)EP(S/tBS) was 31.0% by mol from $^1$H-NMR analysis.

(2) Production of an Electrolyte Membrane for Fuel Cells

A 23% by mass solution in toluene/isobutyl alcohol (mass ratio 8/2) of the sulfonated (S/tBS)EP(S/tBS) obtained in (1) was prepared, and the solution was applied on a PET film after a mold releasing treatment (made by Toyobo Co., "Toyobo Ester Film K1504") at a thickness of about 450 μm, and sufficiently dried at room temperature and then sufficiently vacuum dried to obtain a membrane of 49 μm thickness.

Comparative Example 1-1

(1) Synthesis of a Sulfonated SEBS

A sulfonating reagent was prepared by reacting 17.1 ml of acetic anhydride with 7.64 ml of sulfuric acid at 0° C. in 34.2 ml of methylene chloride. Separately, 100 g of a SEBS (styrene-(ethylene-butylene)-styrene) block copolymer (made by KURARAY Co., Ltd., "Septon 8007") was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 4 hours to dissolve the block copolymer. After the dissolution, the sulfonating reagent was gradually added dropwise over a period of 5 minutes. After stirring at 35° C. for 5 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated SEBS. The sulfonation proportion of the benzene rings of the styrene units in the sulfonated SEBS was 29.0% by mol from $^1$H-NMR analysis.

(2) Production of an Electrolyte Membrane for Fuel Cells

A 5% by mass solution in THF of the sulfonated SEBS obtained in (1) was prepared, and the solution was cast on a polytetrafluoroethylene sheet at a thickness of about 1,000 μm, sufficiently dried at room temperature and then sufficiently vacuum dried to obtain a membrane of 52 μm thickness.

Comparative Example 1-2

(2) Production of an Electrolyte Membrane for Fuel Cells

A 18% by mass solution in toluene/isobutyl alcohol (mass ratio 8/2) of the sulfonated SEBS obtained in (1) of Comparative example 1-1 was prepared, and the solution was applied on a PET film after a mold releasing treatment (made by Toyobo Co., "Toyobo Ester Film K1504") at a thickness of about 550 μm, and sufficiently dried at room temperature and then sufficiently vacuum dried to obtain a membrane of 50 μm thickness.

Comparative Example 1-3

A Perfluorocarbonsulfonic Acid Polymer Electrolyte Membrane

As a perfluorocarbonsulfonic acid polymer electrolyte membrane, Nafion film made by Dupont Co. (Nafion 117) was chosen.

<Tests for Evaluation of Performance of the Polymer Electrolyte Membranes of Examples 1-1 and 1-2 and Comparative Examples 1-1 to 1-3 as an Electrolyte Membrane for Polymer Electrolyte Fuel Cells>

In the following tests of 1) to 3), the membrane produced from the sulfonated block copolymer obtained in each example or comparative example or the Nafion membrane was used as a sample.

1) Measurement of Ion Exchange Capacity

A sample was weighed (a (g)) in a glass vessel which can be shut tightly, an excess amount of an aqueous saturated solution of sodium chloride was added thereto, and the mixture was stirred overnight. Hydrogen chloride formed in the system was titrated (b (ml)) with a 0.01 N aqueous NaOH standard solution (titer f) using a phenolphthalein solution as an indicator. The ion exchange capacity of the sample was calculated according to the following equation.

Ion exchange capacity (meq/g)=$(0.01 \times b \times f)/a$

2) Measurement of Electric Resistance of a Membrane

A sample of 1 cm×4 cm was put between a pair of platinum electrodes, and the composite was set in an open-air cell. The resulting open-air cell was placed in a constant temperature and constant humidity chamber whose inside temperature and relative humidity were adjusted to 60° C. and 90%, respectively, and the electric resistance of the membrane was measured by an alternating current impedance method.

3) Methanol Permeation Rate

A methanol permeation rate was calculated by setting an electrolyte membrane in the center of an H-type cell, putting 55 ml of a 10 M (mol/liter) aqueous methanol solution in one of the resulting two spaces and 55 ml of pure water in the other space, stirring both liquids at 25° C. and measuring the amount of methanol diffusing through the electrolyte membrane into the pure water using gas chromatography (the area of the electrolyte membrane 4.5 cm$^2$).

<Results of the Performance Tests as a Polymer Electrolyte Membrane>

The results of electric resistance of the membrane and the methanol permeation rate of a 10 M-MeOH aqueous solution measured on the membranes produced in Examples 1-1 and 1-2 and Comparative examples 1-1 and 1-2 and the Nafion membrane of Comparative example 1-3 are shown in Table 1.

TABLE 1

|  | Membrane thickness (μm) | Sulfonation proportion (mol %/ benzene ring) | Ion exchange capacity (meq/g) | Electric resistance of membrane (mΩ · cm$^2$) (60° C., 90%) | Methanol permeation rate (μmol · cm$^{-2}$ · min$^{-1}$) |
|---|---|---|---|---|---|
| Example 1-1 | 52 | 29 | 0.70 | 99 | 46.6 |
| Example 1-2 | 49 | 31.0 | 0.72 | 109 | 29.4 |
| Com. exam. 1-1 | 52 | 29.0 | 0.75 | 95 | 93.8 |
| Com. exam. 1-2 | 50 | 29.0 | 0.75 | 117 | 67.0 |
| Com. exam. 1-3 | 175 | — | 0.91 | 213 | 78.5 |

Com. exam.: Comparative example

It was revealed from comparison of Examples 1-1 and 1-2 with Comparative examples 1-1 and 1-2 that when a hydrogen atom directly bonded to the benzene ring is replaced with an alkyl group, in comparison with a case where it is not replaced, the electric resistance of the membrane is not largely changed, but methanol permeability thereof is largely inhibited. The reason is surmised to be that, in the case of a styrene derivative substituted by an alkyl group, hydrophobicity is higher than that of styrene, and, thus, hydrophobicity inside ion channels formed by polymer block (A) became higher and the methanol permeation rate became smaller.

Further, it was revealed from comparison of Examples 1-1 and 1-2 with Comparative example 1-3 that in the polymer electrolyte membrane of Embodiment 1 of the invention, both of the electric resistance and methanol permeability of the membrane are largely lowered, compared with the Nafion membrane as a representative example of electrolyte membranes for fuel cells.

Therefore, it can be said that the polymer electrolyte membrane of Embodiment 1 of the invention is very useful as a polymer electrolyte membrane for polymer electrolyte fuel cells, particularly as a polymer electrolyte membrane for direct methanol fuel cells.

Embodiment 2 (Restraining Phase)

Referential Example 2-1

Production of a Block Copolymer Composed of Polystyrene (Polymer Block (A2a)), Hydrogenated Polyisoprene (Polymer Block (B)) and Poly(4-Tert-Butylstyrene) (Polymer Block (A2b))

After 456 ml of dehydrated cyclohexane and 4.6 ml of sec-butyllithium (1.3M-cyclohexane solution) were put in a 1,000-ml egg-plant type flask, 24.7 ml of 4-tert-butylstyrene, 15.8 ml of styrene and 79.4 ml of isoprene were added successively to subject them to successive polymerization at 30° C., and then 27.3 ml of a solution of 3% by mass of phenyl benzoate in cyclohexane was added to conduct coupling reaction, whereby a poly(4-tert-butylstyrene)-b-polystyrene-b-polyisoprene-b-polystyrene-b-poly(4-tert-butylstyrene) (hereinafter, abbreviated as tBSSIStBS) was synthesized. The number average molecular weight (GPC measurement, in terms of polystyrene) of the obtained tBSSIStBS was 56,600, the amount of the 1,4-bond, the content of the styrene unit and the content of the 4-tert-butylstyrene unit determined by $^1$H-NMR measurement were 94.2% by mol, 13% by mass and 28% by mass, respectively.

A solution of the synthesized tBSSIStBS in cyclohexane was prepared, the solution was put in a pressure proof vessel whose inside atmosphere had sufficiently been replaced with nitrogen, and then, hydrogenation reaction was conducted at 50° C. for 12 hours in an atmosphere of hydrogen using an Ni/Al Ziegler hydrogenating catalyst to obtain a poly(4-tert-butylstyrene)-b-polystyrene-b-hydrogenated polyisoprene-b-polystyrene-b-poly(4-tert-butylstyrene) (hereinafter abbreviated as tBSSEPStBS). The hydrogenation proportion of the tBSSEPStBS was calculated by $^1$H-NMR spectrum measurement to be 99.9%.

Referential Example 2-2

Production of a Block Copolymer Composed of Polystyrene (Polymer Block (A2a)), Hydrogenated Polyisoprene (Polymer Block (B)) and Poly(4-Tert-Butylstyrene) (Polymer Block (A2b))

After 152 ml of dehydrated cyclohexane and 1.00 ml of sec-butyllithium (1.3M-cyclohexane solution) were put in a 1,000-ml egg-plant type flask, 5.14 ml of 4-tert-butylstyrene, 4.95 ml of styrene and 30.9 ml of isoprene were added successively to subject them to successive polymerization at 30° C., and then 6.00 ml of a solution of 3% by mass of phenyl benzoate in cyclohexane was added to conduct coupling reaction, whereby a poly(4-tert-butylstyrene)-b-polystyrene-b-polyisoprene-b-polystyrene-b-poly(4-tert-butylstyrene) (tBSSIStBS) was synthesized. The number average molecular weight (GPC measurement, in terms of polystyrene) of the obtained tBSSIStBS was 80,750, and the amount of the 1,4-bond, the content of the styrene unit and the content of the 4-tert-butylstyrene unit determined by $^1$H-NMR measurement were 94.2% by mol, 15.0% by mass and 15.0% by mass, respectively.

A solution of the synthesized tBSSIStBS in cyclohexane was prepared, the solution was put in a pressure proof vessel whose inside atmosphere had sufficiently been replaced with nitrogen, and then, hydrogenation reaction was conducted at 50° C. for 10 hours in an atmosphere of hydrogen using an Ni/Al Ziegler hydrogenating catalyst to obtain a poly(4-tert-butylstyrene)-b-polystyrene-b-hydrogenated polyisoprene-b-polystyrene-b-poly(4-tert-butylstyrene) (tBSSEPStBS). The hydrogenation proportion of the tBSSEPStBS was calculated by $^1$H-NMR spectrum measurement to be 99.3%.

Referential Example 2-3

Production of a Block Copolymer Composed of Polystyrene (Polymer Block (A2a)), Hydrogenated Polyisoprene (Polymer Block (B)) and Poly(4-Tert-Butylstyrene) (Polymer Block (A2b))

After 1,010 ml of dehydrated cyclohexane and 6.8 ml of sec-butyllithium (1.3M-cyclohexane solution) were put in a 2,000-ml egg-plant type flask, 45.7 ml of 4-tert-butylstyrene, 44.0 ml of styrene and 177 ml of isoprene were added successively to subject them to successive polymerization at 30° C., and then 39.5 ml of a solution of 3% by mass of phenyl benzoate in cyclohexane was added to conduct coupling reaction, whereby a poly(4-tert-butylstyrene)-b-polystyrene-b-polyisoprene-b-polystyrene-b-poly(4-tert-butylstyrene) (tBSSIStBS) was synthesized. The number average molecular weight (GPC measurement, in terms of polystyrene) of the obtained tBSSIStBS was 71,560, and the amount of the 1,4-bond, the content of the styrene unit and the content of the 4-tert-butylstyrene unit determined by $^1$H-NMR measurement were 94.0% by mol, 19.0% by mass and 21.0% by mass, respectively.

A solution of the synthesized tBSSIStBS in cyclohexane was prepared, the solution was put in a pressure proof vessel whose inside atmosphere had sufficiently been replaced with nitrogen, and then, hydrogenation reaction was conducted at 50° C. for 8 hours in an atmosphere of hydrogen using an Ni/Al Ziegler hydrogenating catalyst to obtain a poly(4-tert-butylstyrene)-b-polystyrene-b-hydrogenated polyisoprene-b-polystyrene-b-poly(4-tert-butylstyrene) (tBSSEPStBS). The hydrogenation proportion of the tBSSEPStBS was calculated by $^1$H-NMR spectrum measurement to be 99.0%.

Referential Example 2-4

Production of a Block Copolymer (SEBS) Composed of Polystyrene (Polymer Block (A2a)) and Hydrogenated Polybutadiene (Polymer Block (B))

In a similar process to a previously reported process (JP-A-2005-281373), a polystyrene-b-polybutadiene-b-polystyrene (hereinafter abbreviated as SBS) was synthesized using, in synthesis of polymer block (A2a), styrene as an aromatic vinyl compound and using, in synthesis of polymer block (B), butadiene. The number average molecular weight of the resulting SBS was 69,700, and, in the SBS, the amount of the 1,4-bond and the content of the styrene unit determined by $^1$H-NMR measurement were 60.4% by mol and 39.6% by mass, respectively.

The procedure of Referential example 2-1 was repeated except that the synthesized SBS was used and hydrogenation reaction was conducted at 50° C. for 7 hours, whereby a polystyrene-b-hydrogenated polybutadiene-b-polystyrene (hereinafter abbreviated as SEBS) was obtained with a hydrogenation proportion of 99.7%.

Referential Example 2-5

Production of a Block Copolymer (mSEBmS) Composed of Poly (α-Methylstyrene) (Polymer Block (A2a)) and Hydrogenated Polybutadiene (Polymer Block (B))

In a similar process to a previously reported process (WO 02/40611), a poly (α-methylstyrene)-b-polybutadiene-b-poly(α-methylstyrene) triblock copolymer (hereinafter abbreviated as mSBmS) was synthesized. The number average molecular weight (GPC measurement, in terms of polystyrene) of the resulting mSBmS was 80,590, and, in the mSBmS, the amount of the 1,4-bond and the content of the α-methylstyrene unit determined by $^1$H-NMR measurement were 58.9% by mol and 28.7% by mass, respectively. Further, it was made clear through composition analysis by $^1$H-NMR spectrum measurement that α-methylstyrene was not substantially copolymerized into the polybutadiene block.

The procedure of Referential example 2-1 was repeated except that the synthesized mSBmS was used and hydrogenation reaction was conducted at 80° C. for 5 hours, whereby a poly(α-methylstyrene)-b-hydrogenated polybutadiene-b-poly(α-methylstyrene) triblock copolymer (hereinafter abbreviated as mSEBmS) was obtained with a hydrogenation proportion of 99.7%.

Referential Example 2-6

Production of a Block Copolymer Composed of Polystyrene (Polymer Block (A2a)), Hydrogenated Polyisoprene (Polymer Block (B)) and Poly(4-Tert-Butylstyrene) (Polymer Block (A2b))

After 479 ml of dehydrated cyclohexane and 3.3 ml of sec-butyllithium (1.3M-cyclohexane solution) were put in a 1,000-ml egg-plant type flask, 47.1 ml of 4-tert-butylstyrene, 12.9 ml of styrene and 60.6 ml of isoprene were added successively to subject them to successive polymerization at 30° C., and then 19.1 ml of a solution of 3% by mass of phenyl benzoate in cyclohexane was added to conduct coupling reaction, whereby a poly(4-tert-butylstyrene)-b-polystyrene-b-polyisoprene-b-polystyrene-b-poly(4-tert-butylstyrene) (hereinafter, abbreviated as tBSSIStBS) was synthesized. The number average molecular weight (GPC measurement, in terms of polystyrene) of the obtained tBSSIStBS was 65,700, and the amount of the 1,4-bond, the content of the styrene unit and the content of the 4-tert-butylstyrene unit determined by $^1$H-NMR measurement were 94.0% by mol, 13.4% by mass and 43.5% by mass, respectively.

A solution of the synthesized tBSSIStBS in cyclohexane was prepared, the solution was put in a pressure proof vessel whose inside atmosphere had sufficiently been replaced with nitrogen, and then, hydrogenation reaction was conducted at 50° C. for 12 hours in an atmosphere of hydrogen using an Ni/Al Ziegler hydrogenating catalyst to obtain a poly(4-tert-butylstyrene)-b-polystyrene-b-hydrogenated polyisoprene-b-polystyrene-b-poly(4-tert-butylstyrene) (hereinafter abbreviated as tBSSEPStBS). The hydrogenation proportion of the tBSSEPStBS was calculated by $^1$H-NMR spectrum measurement to be 99.9%.

Referential Example 2-7

Production of a Block Copolymer Composed of Polystyrene (Polymer Block (A2a)), Hydrogenated Polyisoprene (Polymer Block (B)) and Poly(4-Tert-Butylstyrene) (Polymer Block (A2b))

After 480 ml of dehydrated cyclohexane and 4.8 ml of sec-butyllithium (1.3M-cyclohexane solution) were put in a 1,000-ml egg-plant type flask, 43.9 ml of 4-tert-butylstyrene, 18.6 ml of styrene and 56.4 ml of isoprene were added successively to subject them to successive polymerization at 30° C., and then 24.8 ml of a solution of 3% by mass of phenyl benzoate in cyclohexane was added to conduct coupling reaction, Whereby a poly(4-tert-butylstyrene)-b-polystyrene-b-polyisoprene-b-polystyrene-b-poly(4-tert-butylstyrene) (tBSSIStBS) was synthesized. The number average molecular weight (GPC measurement, in terms of polystyrene) of the obtained tBSSIStBS was 47,800, and the amount of the 1,4-bond, the content of the styrene unit and the content of the 4-tert-butylstyrene unit determined by $^1$H-NMR measurement were 94.1% by mol, 18.1% by mass and 41.3% by mass, respectively.

A solution of the synthesized tBSSIStBS in cyclohexane was prepared, the solution was put in a pressure proof vessel whose inside atmosphere had sufficiently been replaced with nitrogen, and then, hydrogenation reaction was conducted at 50° C. for 12 hours in an atmosphere of hydrogen using an Ni/Al Ziegler hydrogenating catalyst to obtain a poly(4-tert-butylstyrene)-b-polystyrene-b-hydrogenated polyisoprene-b-polystyrene-b-poly(4-tert-butylstyrene) (tBSSEPStBS). The hydrogenation proportion of the tBSSEPStBS was calculated by $^1$H-NMR spectrum measurement to be 99.9%.

Referential Example 2-8

Production of a Block Copolymer Composed of Polystyrene (Polymer Block (A2a)), Hydrogenated Polyisoprene (Polymer Block (B)) and Poly(4-Tert-Butylstyrene) (Polymer Block (A2b))

After 512 ml of dehydrated cyclohexane and 3.25 ml of sec-butyllithium (0.8M-cyclohexane solution) were put in a 1,400-ml autoclave, 39.1 ml of 4-tert-butylstyrene, 12.1 ml of styrene and 57.1 ml of isoprene were added successively to subject them to successive polymerization at 30° C., and then 10.4 ml of a solution of 3% by mass of phenyl benzoate in cyclohexane was added to conduct coupling reaction, whereby a poly(4-tert-butylstyrene)-b-polystyrene-b-polyisoprene-b-polystyrene-b-poly(4-tert-butylstyrene) (tBSSIStBS) was synthesized. The number average molecular weight (GPC measurement, in terms of polystyrene) of the obtained tBSSIStBS was 103,900, and the amount of the 1,4-bond, the content of the styrene unit and the content of the 4-tert-butylstyrene unit determined by $^1$H-NMR measurement were 94.0% by mol, 12.3% by mass and 40.5% by mass, respectively.

A solution of the synthesized tBSSIStBS in cyclohexane was prepared, the solution was put in a pressure proof vessel whose inside atmosphere had sufficiently been replaced with nitrogen, and then, hydrogenation reaction was conducted at 50° C. for 12 hours in an atmosphere of hydrogen using an Ni/Al Ziegler hydrogenating catalyst to obtain a poly(4-tert-butylstyrene)-b-polystyrene-b-hydrogenated polyisoprene-b-polystyrene-b-poly(4-tert-butylstyrene) (tBSSEPStBS). The hydrogenation proportion of the tBSSEPStBS was calculated by $^1$H-NMR spectrum measurement to be 99.9%.

Example 2-1

(1) Synthesis of Sulfonated tBSSEPStBS 15 g of the block copolymer obtained in Referential example 2-1 (tBSSEPStBS) was vacuum dried for 1 hour in a glass-made reaction vessel equipped with a stirrer, the inside atmosphere of the reaction vessel was replaced with nitrogen, 150 ml of methylene chloride was added, and the mixture was stirred at 35° C. for 2 hours to dissolve the block copolymer. After the dissolution, a sulfonating reagent prepared by reacting 3.2 ml of acetic anhydride with 1.4 ml of sulfuric acid at 0° C. in 6.4 ml of methylene chloride was gradually added dropwise thereto over a period of 5 minutes. After stirring at 35° C. for 12 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 63.9% by mol from $^1$H-NMR analysis and the ion exchange capacity was 0.76 meq/g.

(2) Production of an Electrolyte Membrane for Fuel Cells

A 25% by mass solution in toluene/isobutyl alcohol (mass ratio 8/2) of the sulfonated tBSSEPStBS obtained in (1) was prepared, and the solution was applied on a PET film after a mold releasing treatment (made by Toyobo Co., "Toyobo Ester Film K1504") at a thickness of about 350 μm, and sufficiently dried at room temperature and then sufficiently vacuum dried to obtain a membrane of 50 μm thickness.

(3) Production of a Single Cell for Polymer Electrolyte Fuel Cells

Electrodes for a polymer electrolyte fuel cell were produced according to the following procedure. A solution of 5% by mass Nafion in methanol was mixed with a carbon-supported Pt—Ru alloy catalyst so that the mass ratio of the Pt—Ru alloy to Nafion could be 2:1, whereby a paste of uniform dispersion was prepared. This paste was applied onto a transfer sheet and dried for 24 hours to prepare a catalyst sheet for the anode side. A solution of 5% by mass Nafion in a mixed solvent of a lower alcohol and water was mixed with a carbon-supported Pt catalyst so that the mass ratio of the Pt catalyst to Nafion could be 2:1, whereby a paste of uniform dispersion was prepared, and then, a catalyst sheet for the cathode side was prepared in a similar way as in the anode side. The electrolyte membrane for fuel cells produced in (2) was put between the above two kinds of catalyst sheets so that the membrane and the catalyst side of each catalyst sheet could face each other, the resulting composite was put between two sheets of heat resistant film, the resulting composite was put between two stainless steel sheets, and the resulting composite was hot pressed (150° C., 100 kg/cm$^2$, 10 minutes) to bond the membrane and the catalyst sheets together. The stainless steel sheets and the sheets of heat resistant film were removed, and finally, the transfer sheets were peeled to produce a membrane electrode assembly. The membrane electrode assembly was put between two sheets of carbon paper, the resulting composite was put between two sheets of electrically conductive separators also having a role of paths for gas supply, the resulting composite was put between two electric current-collecting sheets, and the resulting composite was put between two clamping sheets to assemble a test cell for polymer electrolyte fuel cells.

Example 2-2

(1) Synthesis of Sulfonated tBSSEPStBS 15 g of the block copolymer obtained in Referential example 2-1 (tBSSEPStBS) was vacuum dried for 1 hour in a glass-made reaction vessel equipped with a stirrer, the inside atmosphere of the reaction vessel was replaced with nitrogen, 150 ml of methylene chloride was added, and the mixture was stirred at 35° C. for 2 hours to dissolve the block copolymer. After the dissolution, a sulfonating reagent prepared by reacting 6.4 ml of acetic anhydride with 2.8 ml of sulfuric acid at 0° C. in 12.8 ml of methylene chloride was gradually added dropwise thereto over a period of 5 minutes. After stirring at 35° C. for 24 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 99.5% by mol from $^1$H-NMR analysis and the ion exchange capacity was 1.15 meq/g.

(2) Production of an Electrolyte Membrane for Fuel Cells

A membrane of 50 μm thickness was obtained in the same way as in (2) of Example 2-1.

Example 2-3

(1) Synthesis of Sulfonated tBSSEPStBS 15 g of the block copolymer obtained in Referential example 2-3 (tBSSEPStBS) was vacuum dried for 1 hour in a glass-made reaction vessel equipped with a stirrer, the inside atmosphere of the reaction vessel was replaced with nitrogen, 150 ml of methylene chloride was added, and the mixture was stirred at 35° C. for 2 hours to dissolve the block copolymer. After the dissolution, a sulfonating reagent prepared by reacting 3.8 ml of acetic anhydride with 1.6 ml of sulfuric acid at 0° C. in 7.6 ml of methylene chloride was gradually added dropwise thereto over a period of 5 minutes. After stirring at 35° C. for 12 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 57.0% by mol from $^1$H-NMR analysis and the ion exchange capacity was 0.97 meq/g.

(2) Production of an Electrolyte Membrane for Fuel Cells

A 5% by mass solution in THF of the sulfonated tBSSEPStBS obtained in (1) was prepared, and the solution was cast on a polytetrafluoroethylene sheet at a thickness of about 1,000 μm, sufficiently dried at room temperature and then sufficiently vacuum dried to obtain a membrane of 50 μm thickness.

Example 2-4

(1) Synthesis of Sulfonated tBSSEPStBS 15 g of the block copolymer obtained in Referential example 2-2 (tBSSEPStBS) was vacuum dried for 1 hour in a glass-made reaction vessel equipped with a stirrer, the inside atmosphere of the reaction vessel was replaced with nitrogen, 150 ml of methylene chloride was added, and the mixture was stirred at 35° C. for 2 hours to dissolve the block copolymer. After the dissolution, a sulfonating reagent prepared by reacting 3.0 ml of acetic anhydride with 1.3 ml of sulfuric acid at 0° C. in 6.1 ml of methylene chloride was gradually added dropwise thereto over a period of 5 minutes. After stirring at 35° C. for 20 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 87.2% by mol from $^1$H-NMR analysis and the ion exchange capacity was 1.12 meq/g.

(2) Production of an Electrolyte Membrane for Fuel Cells

The procedure of (2) of Example 2-3 was repeated except for using the sulfonated tBSSEPStBS obtained in (1), whereby a membrane of 50 μm thickness was obtained.

Example 2-5

(1) Synthesis of Sulfonated tBSSEPStBS 15 g of the block copolymer obtained in Referential example 2-3 (tBSSEPStBS) was vacuum dried for 1 hour in a glass-made reaction vessel equipped with a stirrer, the inside atmosphere of the reaction vessel was replaced with nitrogen, 150 ml of methylene chloride was added, and the mixture was stirred at 35° C. for 2 hours to dissolve the block copolymer. After the dissolution, a sulfonating reagent prepared by reacting 9.0 ml of acetic anhydride with 3.9 ml of sulfuric acid at 0° C. in 18.1 ml of methylene chloride was gradually added dropwise thereto over a period of 5 minutes. After stirring at 35° C. for 24 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 99.1% by mol from $^1$H-NMR analysis and the ion exchange capacity was 1.60 meq/g.

(2) Production of an Electrolyte Membrane for Fuel Cells

The procedure of (2) of Example 2-3 was repeated except for using the sulfonated tBSSEPStBS obtained in (1), whereby a membrane of 50 μm thickness was obtained.

Example 2-6

(2) Production of an Electrolyte Membrane for Fuel Cells

The procedure of (2) of Example 2-3 was repeated except that a 5% by mass solution in toluene/isobutyl alcohol (mass ratio 8/2) of the sulfonated tBSSEPStBS obtained in (1) of Example 2-5 was used, whereby a membrane of 50 μm thickness was obtained.

Example 2-7

(1) Synthesis of Sulfonated tBSSEPStBS 50 g of the block copolymer obtained in Referential example 2-6 (tBSSEPStBS) was vacuum dried for 1 hour in a glass-made reaction vessel equipped with a stirrer, the inside atmosphere of the reaction vessel was replaced with nitrogen, 500 ml of methylene chloride was added, and the mixture was stirred at 35° C. for 2 hours to dissolve the block copolymer. After the dissolution, a sulfonating reagent prepared by reacting 24.8 ml of acetic anhydride with 10.7 ml of sulfuric acid at 0° C. in 49.5 ml of methylene chloride was gradually added dropwise thereto over a period of 5 minutes. After stirring at 35° C. for 72 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 91.0% by mol from $^1$H-NMR analysis and the ion exchange capacity was 1.05 meq/g.

(2) Production of an Electrolyte Membrane for Fuel Cells

A 25% by mass solution in toluene/isobutyl alcohol (mass ratio 8/2) of the sulfonated tBSSEPStBS obtained in (1) was prepared, and the solution was applied on a PET film after a mold releasing treatment (made by Toyobo Co., "Toyobo Ester Film K1504") at a thickness of about 200 µm and dried at 80° C. for 3 minutes using a hot air dryer to obtain a membrane of 31 µm thickness.

Example 2-8

(1) Synthesis of Sulfonated tBSSEPStBS 50 g of the block copolymer obtained in Referential example 2-6 (tBSSEPStBS) was vacuum dried for 1 hour in a glass-made reaction vessel equipped with a stirrer, the inside atmosphere of the reaction vessel was replaced with nitrogen, 500 ml of methylene chloride was added, and the mixture was stirred at 35° C. for 2 hours to dissolve the block copolymer. After the dissolution, a sulfonating reagent prepared by reacting 8.4 ml of acetic anhydride with 3.7 ml of sulfuric acid at 0° C. in 16.9 ml of methylene chloride was gradually added dropwise thereto over a period of 5 minutes. After stirring at 35° C. for 4 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 46.0% by mol from $^1$H-NMR analysis and the ion exchange capacity was 0.56 meq/g.

(2) Production of an Electrolyte Membrane for Fuel Cells

A 30% by mass solution in toluene/isobutyl alcohol (mass ratio 8/2) of the sulfonated tBSSEPStBS obtained in (1) was prepared, and the solution was applied on a PET film after a mold releasing treatment (made by Toyobo Co., "Toyobo Ester Film K1504") at a thickness of about 150 µm and dried at 80° C. for 3 minutes using a hot air dryer to obtain a membrane of 29 µm thickness.

Example 2-9

(1) Synthesis of Sulfonated tBSSEPStBS 50 g of the block copolymer obtained in Referential example 2-7 (tBSSEPStBS) was vacuum dried for 1 hour in a glass-made reaction vessel equipped with a stirrer, the inside atmosphere of the reaction vessel was replaced with nitrogen, 500 ml of methylene chloride was added, and the mixture was stirred at 35° C. for 2 hours to dissolve the block copolymer. After the dissolution, a sulfonating reagent prepared by reacting 33.5 ml of acetic anhydride with 14.5 ml of sulfuric acid at 0° C. in 67.0 ml of methylene chloride was gradually added dropwise thereto over a period of 5 minutes. After stirring at 35° C. for 72 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 100% by mol from $^1$H-NMR analysis and the ion exchange capacity was 1.52 meq/g.

(2) Production of an Electrolyte Membrane for Fuel Cells

A 28% by mass solution in toluene/isobutyl alcohol (mass ratio 8/2) of the sulfonated tBSSEPStBS obtained in (1) was prepared, and the solution was applied on a PET film after a mold releasing treatment (made by Toyobo Co., "Toyobo Ester Film K1504") at a thickness of about 150 µm and dried at 80° C. for 3 minutes using a hot air dryer to obtain a membrane of 27 µm thickness.

Example 2-10

(1) Synthesis of Sulfonated tBSSEPStBS 50 g of the block copolymer obtained in Referential example 2-7 (tBSSEPStBS) was vacuum dried for 1 hour in a glass-made reaction vessel equipped with a stirrer, the inside atmosphere of the reaction vessel was replaced with nitrogen, 500 ml of methylene chloride was added, and the mixture was stirred at 35° C. for 2 hours to dissolve the block copolymer. After the dissolution, a sulfonating reagent prepared by reacting 6.7 ml of acetic anhydride with 2.9 ml of sulfuric acid at 0° C. in 13.4 ml of methylene chloride was gradually added dropwise thereto over a period of 5 minutes. After stirring at 35° C. for 4 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 30.0% by mol from $^1$H-NMR analysis and the ion exchange capacity was 0.50 meq/g.

(2) Production of an Electrolyte Membrane for Fuel Cells

A 35% by mass solution in toluene/isobutyl alcohol (mass ratio 8/2) of the sulfonated tBSSEPStBS obtained in (1) was prepared, and the solution was applied on a PET film after a mold releasing treatment (made by Toyobo Co., "Toyobo Ester Film K1504") at a thickness of about 100 µm and dried at 80° C. for 3 minutes using a hot air dryer to obtain a membrane of 31 μm thickness.

Example 2-11

(1) Synthesis of Sulfonated tBSSEPStBS 50 g of the block copolymer obtained in Referential example 2-8 (tBSSEPStBS) was vacuum dried for 1 hour in a glass-made reaction vessel equipped with a stirrer, the inside atmosphere of the reaction vessel was replaced with nitrogen, 500 ml of methylene chloride was added, and the mixture was stirred at 35° C. for 2 hours to dissolve the block copolymer. After the dissolution, a sulfonating reagent prepared by reacting 22.4 ml of acetic anhydride with 9.7 ml of sulfuric acid at 0° C. in 44.8 ml of methylene chloride was gradually added dropwise thereto over a period of 5 minutes. After stirring at 35° C. for 72 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 100% by mol from $^1$H-NMR analysis and the ion exchange capacity was 1.09 meq/g.

(2) Production of an Electrolyte Membrane for Fuel Cells

A 15% by mass solution in toluene/isobutyl alcohol (mass ratio 8/2) of the sulfonated tBSSEPStBS obtained in (1) was prepared, and the solution was applied on a PET film after a mold releasing treatment (made by Toyobo Co., "Toyobo Ester Film K1504") at a thickness of about 350 μm and dried at 80° C. for 3 minutes using a hot air dryer to obtain a membrane of 29 μm thickness.

Example 2-12

(1) Synthesis of Sulfonated tBSSEPStBS 50 g of the block copolymer obtained in Referential example 2-8 (tBSSEPStBS) was vacuum dried for 1 hour in a glass-made reaction vessel equipped with a stirrer, the inside atmosphere of the reaction vessel was replaced with nitrogen, 500 ml of methylene chloride was added, and the mixture was stirred at 35° C. for 2 hours to dissolve the block copolymer. After the dissolution, a sulfonating reagent prepared by reacting 7.9 ml of acetic anhydride with 3.4 ml of sulfuric acid at 0° C. in 15.7 ml of methylene chloride was gradually added dropwise thereto over a period of 5 minutes. After stirring at 35° C. for 4 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The 4-tert-butylstyrene unit of the obtained sulfonated tBSSEPStBS was not sulfonated, and only the styrene unit was sulfonated. The sulfonation proportion of the benzene rings in the styrene units was 49.6% by mol from $^1$H-NMR analysis and the ion exchange capacity was 0.55 meq/g.

(2) Production of an Electrolyte Membrane for Fuel Cells

A 17.5% by mass solution in toluene/isobutyl alcohol (mass ratio 8/2) of the sulfonated tBSSEPStBS obtained in (1) was prepared, and the solution was applied on a PET film after a mold releasing treatment (made by Toyobo Co., "Toyobo Ester Film K1504") at a thickness of about 300 μm and dried at 80° C. for 3 minutes using a hot air dryer to obtain a membrane of 32 μm thickness.

Comparative Example 2-1

(1) Synthesis of Sulfonated SEBS

A sulfonating reagent was prepared by reacting 17.5 ml of acetic anhydride with 7.6 ml of sulfuric acid at 0° C. in 34.9 ml of methylene chloride. Separately, 100 g of a SEBS (styrene-(ethylene-butylene)-styrene) block copolymer (made by KURARAY Co., Ltd., Septon 8007) was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 4 hours to dissolve the block copolymer. After the dissolution, the sulfonating reagent was gradually added dropwise over a period of 5 minutes. After stirring at 35° C. for 4.5 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated SEBS. The sulfonation proportion of the benzene rings of the styrene units in the sulfonated SEBS was 26.1% by mol from $^1$H-NMR analysis and the ion exchange capacity of sulfonated SEBS was 0.68 meq/g.

(2) Production of an Electrolyte Membrane for Fuel Cells

The procedure of (2) of Example 2-3 was repeated except for using the sulfonated SEBS obtained in (1), whereby a membrane of 50 μm thickness was obtained.

Comparative Example 2-2

(1) Synthesis of Sulfonated SEPS

A sulfonated SEPS was obtained in the same way as in (1) of Comparative example 2-1 except that an SEPS (styrene-(ethylene-propylene)styrene) block copolymer (made by KURARAY Co., Ltd., "Septon 2002") was used and the reaction time was made to be 6 hours. The sulfonation proportion of the benzene rings of the styrene units in the sulfonated SEPS was 32.5% by mol from $^1$H-NMR analysis and the ion exchange capacity of sulfonated SEPS was 0.84 meq/g.

(2) Production of an Electrolyte Membrane for Fuel Cells

A 22% by mass solution in toluene/isobutyl alcohol (mass ratio 8/2) of the sulfonated SEPS obtained in (1) was prepared, and the solution was applied on a PET film after a mold releasing treatment (made by Toyobo Co., "Toyobo Ester Film K1504") at a thickness of about 450 μm, sufficiently dried at room temperature and then sufficiently vacuum dried to obtain a membrane of 50 μm thickness.

Comparative Example 2-3

(1) Synthesis of Sulfonated SEBS 30 g of the SEBS obtained in Referential example 2-4 was vacuum dried for 1 hour in a glass-made reaction vessel equipped with a stirrer, the inside atmosphere of the reaction vessel was replaced with nitrogen, 300 ml of methylene chloride was added, and the mixture was stirred at 35° C. for 4 hours to dissolve the block copolymer. After the dissolution, a sulfonating reagent prepared by reacting 6.7 ml of acetic anhydride with 2.9 ml of sulfuric acid at 0° C. in 13.4 ml of methylene chloride was gradually added dropwise thereto over a period of 5 minutes. After stirring at 35° C. for 5 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated SEBS. The sulfonation proportion of the benzene rings in the styrene units of the sulfonated SEBS was 27.4% by mol from $^1$H-NMR analysis and the ion exchange capacity of the sulfonated SEBS was 0.94 meq/g.

(2) Production of an Electrolyte Membrane for Fuel Cells

A membrane of 50 μm thickness was obtained in the same way as in (2) of Example 2-3 except for using the sulfonated SEBS obtained in (1).

Comparative Example 2-4

(1) Synthesis of Sulfonated SEBS 30 g of the SEBS obtained in Referential example 2-4 was vacuum dried for 1 hour in a glass-made reaction vessel equipped with a stirrer, the inside atmosphere of the reaction vessel was replaced with nitrogen, 300 ml of methylene chloride was added, and the mixture was stirred at 35° C. for 4 hours to dissolve the block copolymer. After the dissolution, a sulfonating reagent prepared by reacting 14.6 ml of acetic anhydride with 6.3 ml of sulfuric acid at 0° C. in 29.1 ml of methylene chloride was gradually added dropwise thereto over a period of 5 minutes. After stirring at 35° C. for 5 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated SEBS. The sulfonation proportion of the benzene rings in the styrene units of the sulfonated SEBS was 50.0% by mol from $^1$H-NMR analysis and the ion exchange capacity of the sulfonated SEBS was 1.61 meq/g.

(2) Production of an Electrolyte Membrane for Fuel Cells

A membrane of 50 μm thickness was obtained in the same way as in (2) of Example 2-3 except for using the sulfonated SEBS obtained in (1).

Comparative Example 2-5

(1) Synthesis of Sulfonated mSEBmS 100 g of the block copolymer obtained in Referential example 2-5 (mSEBmS) was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 2 hours to dissolve the block copolymer. After the dissolution, a sulfonating reagent prepared by reacting 21.0 ml of acetic anhydride with 9.34 ml of sulfuric acid at 0° C. in 41.8 ml of methylene chloride was gradually added dropwise thereto over a period of 5 minutes. After stirring at 35° C. for 1 hour, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated mSEBmS. The sulfonation proportion of the benzene rings in the α-methylstyrene units of the sulfonated mSEBmS was 31.4% by mol from $^1$H-NMR analysis and the ion exchange capacity of the sulfonated mSEBmS was 0.70 meq/g.

(2) Production of an Electrolyte Membrane for Fuel Cells

A membrane of 50 μm thickness was obtained in the same way as in (2) of Example 2-1 except that a 18% by mass solution in cyclohexane/isopropyl alcohol (mass ratio 7/3) of the sulfonated mSEBmS obtained in (1) was used and it was applied at a thickness of about 550 μm.

Comparative Example 2-6

As a perfluorocarbonsulfonic acid polymer electrolyte membrane, Nafion film made by Dupont Co. (Nafion 117) was chosen.

Comparative Example 2-7

(1) Synthesis of Sulfonated mSEBmS 90 g of the block copolymer obtained in Referential example 2-5 (mSEBmS) was vacuum dried for 1 hour in a glass-made reaction vessel equipped with a stirrer, the inside atmosphere of the reaction vessel was replaced with nitrogen, 816 ml of methylene chloride was added, and the mixture was stirred at 35° C. for 2 hours to dissolve the block copolymer. After the dissolution, a sulfonating reagent prepared by reacting 9.40 ml of acetic anhydride with 4.20 ml of sulfuric acid at 0° C. in 18.9 ml of methylene chloride was gradually added dropwise thereto over a period of 5 minutes. After stirring at 35° C. for 4 hour, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated mSEBmS. The sulfonation proportion of the benzene rings in the α-methylstyrene units of the sulfonated mSEBmS was 22.5% by mol from $^1$H-NMR analysis and the ion exchange capacity of the sulfonated mSEBmS was 0.49 meq/g.

(2) Production of an Electrolyte Membrane for Fuel Cells

A 17.5% by mass solution in toluene/isobutyl alcohol (mass ratio 8/2) of the sulfonated mSEBmS obtained in (1) was prepared, and the solution was applied on a PET film after a mold releasing treatment (made by Toyobo Co., "Toyobo Ester Film K1504") at a thickness of about 300 μm and dried at 80° C. for 3 minutes using a hot air dryer to obtain a membrane of 30 μm thickness.

Comparative Example 2-8

(1) Synthesis of Sulfonated mSEBmS 35.5 g of the block copolymer obtained in Referential example 2-5 (mSEBmS) was vacuum dried for 1 hour in a glass-made reaction vessel equipped with a stirrer, the inside atmosphere of the reaction vessel was replaced with nitrogen, 300 ml of methylene chloride was added, and the mixture was stirred at 35° C. for 2 hours to dissolve the block copolymer. After the dissolution, a sulfonating reagent prepared by reacting 7.30 ml of acetic anhydride with 3.30 ml of sulfuric acid at 0° C. in 14.7 ml of methylene chloride was gradually added dropwise thereto over a period of 5 minutes. After stirring at 35° C. for 7 hour, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated mSEBmS. The sulfonation proportion of the benzene rings in the α-methylstyrene units of the sulfonated mSEBmS was 50.5% by mol from $^1$H-NMR analysis and the ion exchange capacity of the sulfonated mSEBmS was 1.06 meq/g.

(2) Production of an Electrolyte Membrane for Fuel Cells

A 16.5% by mass solution in toluene/isobutyl alcohol (mass ratio 8/2) of the sulfonated mSEBmS obtained in (1) was prepared, and the solution was applied on a PET film after a mold releasing treatment (made by Toyobo Co., "Toyobo Ester Film K1504") at a thickness of about 300 μm and dried at 80° C. for 3 minutes using a hot air dryer to obtain a membrane of 30 μm thickness.

<Tests for Evaluation of Performance of the Polymer Electrolyte Membranes of Examples 2-1 to 2-12 and Comparative Examples 2-1 to 2-8 as an Electrolyte Membrane for Polymer Electrolyte Fuel Cells>

In the following tests of 2) to 7), the membrane produced from the sulfonated block copolymer obtained in each example or comparative example or the Nafion membrane was used as a sample. As a sample in the test of 1), the sulfonated block copolymer obtained in each example or comparative example or the Nafion membrane was used.

1) Measurement of Ion Exchange Capacity

The same as in Embodiment 1 (alkyl substitution)

2) Measurement of Membrane Strength

A sample was molded into a dumbbell shape and kept at 23° C. under a relative humidity of 50% for more than 24 hours to obtain a dry sample. Separately, a sample was molded into a dumbbell (OK?) shape and kept in water for more than 24 hours to obtain a wet sample. On both samples, breaking strength was measured under a condition of a pulling rate of 500 mm/min.

3) Measurement of Ion Conductivity of Membrane

A sample of 1 cm×4 cm was put between a pair of platinum electrodes, and the composite was set in an open-air cell. The resulting open-air cell was put in a constant temperature and constant humidity chamber whose inside temperature and humidity were adjusted to 60° C. and 90%, respectively, or in water of 40° C., and the ion conductivity of the sample was measured by an alternating current impedance method.

4) Test on Stability of Ion Conductivity of Membrane

A sample of 1 cm×4 cm was put between a pair of platinum electrodes, and the composite was set in an open-air cell. The resulting open-air cell was put in a constant temperature and constant humidity chamber whose inside temperature and relative humidity were adjusted to 40° C. and 50%, respectively, and the ion conductivity of the sample was measured. Then, the open-air cell was put in water of 40° C., the electric resistance and ion conductivity of the sample were measured with time lapse, and time which elapsed before the proportion of change of ion conductivity in one minute became 1% or less was assumed to be stabilization time.

5) Measurement of Linear Expansion Coefficient

A sample was kept at 23° C. under a relative humidity of 50% for more than 12 hours, cut into a piece of 1 cm×4 cm and immersed in a 10M-MeOH aqueous solution for 4 hours. Then, the length in the direction of the long side of the test piece (b (cm)) was measured and its linear expansion coefficient was calculated according to the following equation.

Linear expansion coefficient (%)=($b$−4)/4×100

6) Measurement of Methanol Permeation Rate

A methanol permeation rate was calculated by setting an electrolyte membrane as a sample in the center of an H-type cell, putting 55 ml of a 3 M (mol/liter) aqueous methanol solution in one of the resulting two spaces and 55 ml of pure water in the other space, stirring both liquids at 25° C. and measuring the amount of methanol diffusing through the electrolyte membrane into the pure water using gas chromatography (the area of the electrolyte membrane 4.5 cm$^2$).

7) Evaluation of the Power Generation Performance of a Single Cell for Fuel Cells As to the single cell for polymer electrolyte fuel cells produced in (3) of Example 2-1, power generation performance was evaluated. A 1M-MeOH aqueous solution was used as a fuel, and air was used as an oxidizing agent. The test was conducted at a cell temperature of 60° C. under a condition of MeOH: 1.8 ml/min and air: 250 ml/min.

<Results of Tests on Performance as Polymer Electrolyte Membrane>

The ion conductivities (in the constant temperature and constant humidity chamber), linear expansion coefficients and breaking strengths of the membranes produced in Examples 2-1 to 2-6 and Comparative examples 2-1 to 2-4 and 2-7 to 2-8 and the Nafion membrane of Comparative example 2-6 are shown in Table 2. The ion conductivities (in water), linear expansion coefficients and breaking strengths of the membranes produced in Examples 2-7 to 2-12 and Comparative examples 2-7 to 2-8 are shown in Table 3. In Table 2 and Table 3, retention proportion (%) was calculated as [(breaking strength (MPa) on the wet sample)/(breaking strength (MPa) on the dry sample)]×100.

TABLE 2

|  | Composition of block copolymer A2a/B/A2b (mass ratio) | Sulfonation proportion (mol %/ benzene ring) | Ion exchange capacity (meq/g) | Ion conductivity (90%, 60° C.) (S/cm) | Linear expansion coefficient (%) | Breaking strength | | |
|---|---|---|---|---|---|---|---|---|
|  |  |  |  |  |  | Dry (MPa) | Wet (MPa) | Retention proportion (%) |
| Example 2-1 | 13/59/28 | 64 | 0.76 | 0.056 | 1.5 | 20.0 | 18.3 | 92 |
| Example 2-2 | 13/59/28 | 100 | 1.15 | 0.110 | 5.0 | 19.0 | 16.5 | 87 |
| Example 2-3 | 19/60/21 | 57 | 0.97 | 0.066 | 7.5 | 24.4 | 23.5 | 96 |
| Example 2-4 | 15/70/15 | 87 | 1.12 | 0.099 | 8.8 | 23.4 | 18.5 | 79 |
| Example 2-5 | 19/60/21 | 99 | 1.60 | 0.160 | 21 | 14.7 | 5.80 | 40 |
| Example 2-6 | 19/60/21 | 99 | 1.60 | 0.180 | 21 | 14.5 | 7.11 | 49 |
| Com. exam. 2-1 | 29/71/— | 26 | 0.68 | 0.061 | 13 | 31.7 | 20.4 | 64 |
| Com. exam. 2-2 | 29/71/— | 33 | 0.84 | 0.099 | 10 | 26.6 | 5.30 | 20 |
| Com. exam. 2-3 | 40/60/— | 27 | 0.94 | 0.069 | 16 | 26.9 | 12.3 | 46 |
| Com. exam. 2-4 | 40/60/— | 50 | 1.61 | 0.120 | 30 | 23.0 | 4.20 | 18 |

TABLE 2-continued

|  | Composition of block copolymer A2a/B/A2b (mass ratio) | Sulfonation proportion (mol %/ benzene ring) | Ion exchange capacity (meq/g) | Ion conductivity (90%, 60° C.) (S/cm) | Linear expansion coefficient (%) | Breaking strength Dry (MPa) | Breaking strength Wet (MPa) | Retention proportion (%) |
|---|---|---|---|---|---|---|---|---|
| Com. exam. 2-6 | — | — | 0.91 | 0.082 | 20 | 35.0 | 24.0 | 69 |
| Com. exam. 2-7 | 29/71/— | 23 | 0.49 | 0.020 | 2.0 | 12.0 | 9.10 | 76 |
| Com. exam. 2-8 | 29/71/— | 51 | 1.06 | 0.090 | 14 | 17.0 | 11.0 | 65 |

TABLE 3

|  | Composition of block copolymer A2a/B/A2b (mass ratio) | Sulfonation proportion (mol %/ benzene ring) | Ion exchange capacity (meq/g) | Ion conductivity (40° C., in water) (S/cm) | Linear expansion coefficient (%) | Breaking strength Dry (MPa) | Breaking strength Wet (MPa) | Retention proportion (%) |
|---|---|---|---|---|---|---|---|---|
| Example 2-7 | 13/43/44 | 91 | 1.05 | 0.055 | 3.5 | 14.1 | 13.3 | 94 |
| Example 2-8 | 13/43/44 | 46 | 0.56 | 0.027 | 0.50 | 16.7 | 14.6 | 87 |
| Example 2-9 | 18/41/41 | 100 | 1.52 | 0.100 | 5.8 | 10.5 | 7.7 | 73 |
| Example 2-10 | 18/41/41 | 30 | 0.50 | 0.017 | 0.50 | 15.2 | 14.7 | 97 |
| Example 2-11 | 12/47/41 | 100 | 1.09 | 0.062 | 3.5 | 17.6 | 16.4 | 93 |
| Example 2-12 | 12/47/41 | 50 | 0.55 | 0.020 | 0.90 | 26.4 | 23.9 | 91 |
| Com. exam. 2-7 | 29/71/— | 23 | 0.49 | 0.008 | 2.0 | 12.0 | 9.10 | 76 |
| Com. exam. 2-8 | 29/71/— | 51 | 1.06 | 0.077 | 14 | 17.0 | 11.0 | 65 |

It is apparent from Table 2 that, when ion conductivity and/or ion exchange capacity are/is in the same level, the polymer electrolyte membranes of Examples 2-1 to 2-6 wherein there is a polymer block (A2b) functioning as a restraining phase can largely improve the retention proportion of breaking strength during a wet state to that during a dry state and largely lower linear expansion coefficients as an index of dimensional change, compared to the membranes of Comparative examples 2-1 to 2-4 made of a block copolymer not having a restraining phase and the Nafion membrane of Comparative example 2-6 as a representative example of electrolyte membranes for fuel cells.

Further, it is apparent from comparison between Examples 2-7 to 2-12 and Comparative examples 2-7 to 2-8 in Table 3 that, when ion conductivity and/or ion exchange capacity are/is in the same level, in polymer electrolyte membranes wherein the weight proportion of the restraining phase was made larger, both of the retention proportion of breaking strength and linear expansion coefficients are further improved.

The ion conductivities and linear expansion coefficients of the membranes produced in Examples 2-1 and 2-7 to 2-12 and Comparative examples 2-1, 2-5, 2-7 and 2-8 are shown in Table 4. Separately, each of the membranes was immersed in an aqueous 10 M (mol/liter) methanol solution at room temperature for 68 hours and sufficiently washed with pure water. On both of the membranes before and after the methanol treatment, the methanol permeation rate of an aqueous 3 M methanol solution was measured. The results are also shown in Table 4. In Table 4, the proportion of change in the methanol permeation rate (%) was calculated as [(the methanol permeation rate of the aqueous 3 M methanol solution after the treatment with the aqueous 10 M methanol solution ($\mu mol \cdot cm^{-2} \cdot min^{-1}$)/(the methanol permeation rate of the aqueous 3 M methanol solution before the treatment with the aqueous 10 M methanol solution ($\mu mol \cdot cm^{-2} \cdot min^{-1}$)]×100.

TABLE 4

|  | Ion exchange capacity (meq/g) | Ion conductivity (40° C., in water) (S/cm) | Linear expansion coefficient (%) | 3M methanol permeation rate ($\mu mol \cdot cm^{-2} \cdot min^{-1}$) Before treatment with aqueous 10M methanol solution | 3M methanol permeation rate ($\mu mol \cdot cm^{-2} \cdot min^{-1}$) After treatment with aqueous 10M methanol solution | Proportion of change (%) |
|---|---|---|---|---|---|---|
| Example 2-1 | 0.76 | 0.050 | 1.5 | 8.60 | 14.0 | 163 |
| Example 2-7 | 1.05 | 0.055 | 3.5 | 14.8 | 17.5 | 118 |
| Example 2-8 | 0.56 | 0.027 | 0.50 | 5.62 | 8.39 | 149 |
| Example 2-9 | 1.52 | 0.100 | 5.8 | 26.1 | 27.8 | 107 |
| Example 2-10 | 0.50 | 0.017 | 0.50 | 3.17 | 6.57 | 207 |
| Example 2-11 | 1.09 | 0.062 | 3.5 | 20.6 | 23.0 | 111 |
| Example 2-12 | 0.55 | 0.020 | 0.9 | 5.42 | 7.91 | 146 |
| Com. exam. 2-1 | 0.68 | 0.055 | 13 | 15.0 | 67.0 | 447 |
| Com. exam. 2-5 | 0.70 | 0.035 | 2.5 | 6.00 | 31.0 | 517 |
| Com. exam. 2-7 | 0.49 | 0.008 | 2.0 | 1.28 | 9.07 | 709 |
| Com. exam. 2-8 | 1.06 | 0.077 | 14 | 22.9 | 38.6 | 168 |

It was made clear from Table 4 that, in the case of the electrolyte membranes of Comparative examples 2-1, 2-5, 2-7 and 2-8 made of block copolymers having no restraining phase, it was difficult to maintain the linear expansion coefficient and the proportion of change in the methanol permeation rate after the aqueous 10 M methanol solution treatment in a low level at the same time, whereas, in the case of the electrolyte membranes of Examples 2-1 and 2-7 to 2-12 made of block copolymers having polymer block (A2b) forming a restraining phase, when the ion conductivity and/or the ion exchange capacity are/is in the same level, it is possible to maintain the linear expansion coefficient and the proportion of change in the methanol permeation rate of the membrane after the treatment in a low level at the same time.

As to the case where the environment of each of the membranes produced in Examples 2-7, 2-9 and 2-10 and Comparative examples 2-7 and 2-8 was changed from a dry state (40° C., relative humidity 50%) to a wet state (40° C., in water), stabilization time of the ion conductivity of the membrane was measured. The results are shown in Table 5.

TABLE 5

| | Ion exchange capacity (meq/g) | Ion conductivity (40° C., in water) (S/cm) | Stabilization time (min) |
|---|---|---|---|
| Example 2-7 | 1.05 | 0.055 | 8 |
| Example 2-9 | 1.52 | 0.100 | 3 |
| Example 2-10 | 0.50 | 0.017 | 8 |
| Com. exam. 2-7 | 0.49 | 0.008 | 15 |
| Com. exam. 2-8 | 1.06 | 0.077 | 20 |

It was made clear from Table 5 that, compared with Comparative examples 2-7 and 2-8, in the electrolyte membranes of Examples 2-7, 2-9 and 2-10 made of block copolymers having polymer block (A2b) forming a restraining phase, it is possible to largely shorten time needed to stabilize the ion conductivity.

It was made clear from these results that, as a polymer electrolyte membrane for polymer electrolyte fuel cells, the polymer electrolyte membrane of Embodiment 2 of the invention is excellent in durability and can be used stably at the time of long-time operation, and, moreover, is also excellent in starting properties.

As a power generation characteristic of the single cell for polymer electrolyte fuel cells made in (3) of Example 2-1, change of voltage as against current density was measured. The result is shown in FIG. 1. The open circuit voltage of the single cell was 0.68 V and the maximum power density thereof was 50 mW/cm$^2$. From this, it was made clear that the polymer electrolyte membrane of Embodiment 2 of the invention is useful as a polymer electrolyte membrane for polymer electrolyte fuel cells, particularly as a polymer electrolyte membrane for direct methanol fuel cells.

Further, when the single cell after the power generation test was overhauled, no peeling or the like was observed on the membrane electrode assembly, and it was made clear that the polymer electrolyte membrane of Embodiment 2 of the invention is also excellent in bonding properties.

Embodiment 3 (Cross-Linking)

Example 3-1

(1) Synthesis of Sulfonated pmSEBpmS 51 g of the block copolymer obtained in Referential example 1-1 (pmSEBpmS) was vacuum dried for 1 hour in a glass-made reaction vessel equipped with a stirrer, the inside atmosphere of the reaction vessel was replaced with nitrogen, 658 ml of methylene chloride was added, and the mixture was stirred at 35° C. for 2 hours to dissolve the block copolymer. After the dissolution, a sulfonating reagent prepared by reacting 9.40 ml of acetic anhydride with 4.20 ml of sulfuric acid at 0° C. in 18.9 ml of methylene chloride was gradually added dropwise thereto over a period of 5 minutes. After stirring at 35° C. for 7 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated pmSEBpmS. The sulfonation proportion of the benzene rings in the p-methylstyrene units of the sulfonated pmSEBpmS was 33% by mol from $^1$H-NMR analysis and the ion exchange capacity was 0.75 meq/g.

(2) Production of an Electrolyte Membrane for Fuel Cells

A 18% by mass solution in toluene/isobutyl alcohol (mass ratio 8/2) of the sulfonated pmSEBpmS obtained in (1) was prepared, and the solution was applied on a PET film after a mold releasing treatment (made by Toyobo Co., "Toyobo Ester Film K1504") at a thickness of about 550 µm, sufficiently dried at room temperature and then sufficiently vacuum dried to obtain a membrane of 50 µm thickness. The obtained membrane was thermally pressed at 130° C. for 5 minutes under a pressure of 1 MPa to obtain a membrane. When this membrane was put in THF as a good solvent of sulfonated pmSEBpmS so that its concentration could be 3% by mass, the membrane swelled but not dissolved.

Example 3-2

(2) Production of an Electrolyte Membrane for Fuel Cells

A membrane was obtained in the same way as in (2) of Example 3-1 except that, in preparation of a 18% by mass solution in toluene/isobutyl alcohol (mass ratio 8/2) of the sulfonated pmSEBpmS obtained in (1) of Example 3-1, 1,1-bis (tert-butylperoxy)cyclohexane (trade name: Perhexa C; made by NOF Corporation) was added in an amount of 0.1 mol equivalent per the 4-methyl group. As to the membrane before the thermal pressing treatment, a 3% by mass solution in THF as a good solvent of sulfonated pmSEBpmS could be prepared, whereas as to the membrane after the thermal pressing treatment, the membrane swelled but not dissolved.

Comparative Example 3-1

(2) Production of an Electrolyte Membrane for Fuel Cells

The procedure of (2) of Example 3-1 was repeated except that the thermal pressing was not conducted, whereby a membrane of 50 pin thickness was obtained. When the membrane was added to THF so that the concentration could be 3% by mass, it dissolved.

Comparative Example 3-2

(2) Production of an Electrolyte Membrane for Fuel Cells

The procedure of (2) of Example 3-1 was repeated except for using the sulfonated SEBS obtained in (1) of Comparative example 1-1 to obtain a membrane of 50 μm thickness. The obtained membrane dissolved in THF. In the following performance tests, the membrane was used. When the membrane was subjected to the same thermal pressing treatment as in (2) of Example 3-1, and the resulting membrane was added to THF so that the concentration could be 3% by mass, it dissolved.

From the fact that while, in Comparative example 3-1, the membrane not subjected to thermal pressing treatment dissolved in THF, the membrane of Example 3-1 which had been subjected to thermal pressing treatment did not dissolve in THF and swelled, it was confirmed that cross-linking progressed in the latter membrane. Further, from the fact that, when, in Comparative example 3-2, the membrane wherein polymer block (A1) is composed of styrene units was subjected to thermal pressing treatment, the resulting membrane dissolved in THF, it was confirmed that, in Example 3-1, polymer block (A1) composed of p-methylstyrene units was cross-linked.

<Tests for Evaluation of Performance of the Polymer Electrolyte Membranes of Examples 3-1 and 3-2 and Comparative Examples 3-1 and 3-2 as an Electrolyte Membrane for Polymer Electrolyte Fuel Cells>

In the following test of 1), the sulfonated block copolymer obtained in (1) of Example 3-1 or in (1) of Comparative examples 3-2 was used as a sample. In the following tests of 2) and 3), the membrane made of the sulfonated block copolymer, obtained in (2) of each example or each comparative example, and membranes obtained by immersing each membrane in an aqueous 10 M (mol/liter) methanol solution at room temperature for 12 hours and then sufficiently washing the resulting membrane with pure water were used.

1) Ion Exchange Capacity

The same as in Embodiment 1 (alkyl substitution)

2) Ion Conductivity

A sample of 1 cm×4 cm was put between a pair of platinum electrodes, and the composite was set in an open-air cell. The resulting open-air cell was put in a constant temperature and constant humidity chamber whose inside temperature and relative humidity were adjusted to 60° C. and 90%, respectively, and the ion conductivity of the sample was measured by an alternating current impedance method.

3) Methanol Permeation Rate

The same as in Embodiment 2 (restraining phase)

<Results of Tests on Performance as Polymer Electrolyte Membrane>

The results are shown in Table 6.

As apparent from Table 6, as to characteristics between before and after treatment of the membrane with an aqueous 10 M methanol solution, the 3 M methanol permeation rate is particularly liable to change, and, while, in the membranes of Comparative examples 3-1 and 3-2 wherein polymer block (A1) was not cross-linked, the methanol permeation rate of the membrane became largely larger after the treatment, in the membranes of Examples 3-1 and 3-2 wherein polymer block (A1) was cross-linked, change of the methanol permeation rate after the treatment of the membrane was largely inhibited. The reason is surmised to be that change of the structure of ion channels formed by polymer block (A1) was inhibited by cross-linking and change of characteristics such as the methanol permeation rate was largely inhibited.

It was made clear from these results that the polymer electrolyte membrane of Embodiment 3 of the invention can be used stably at the time of long-time operation in polymer electrolyte fuel cells using methanol as a fuel, and is thus excellent in durability, and is very useful as a polymer electrolyte membrane for polymer electrolyte fuel cells.

BRIEF DESCRIPTION OF THE DRAWINGS

FIG. 1 is a drawing showing the current density-output voltage of a single cell for polymer electrolyte fuel cells (Example 2-1 (3)).

The invention claimed is:

1. A polymer electrolyte membrane, comprising as a main ingredient a block copolymer comprising:
a polymer block (A2a);
a polymer block (A2b); and
a polymer block (B),
wherein:
the polymer block (A2a) comprises as a main unit an aromatic vinyl compound unit represented by formula (II):

(II)

wherein $Ar^2$ represents an aryl group having 6 to 14 carbon atoms which aryl group can have 1 to 3 substituents, and $R^1$ represents a hydrogen atom, an alkyl group having 1 to 4 carbon atoms or an aryl group having 6 to 14 carbon atoms which aryl group can have 1 to 3 substituents, and the polymer block (A2a) has ion-conducting groups on the aromatic rings of the aromatic vinyl compound unit;

TABLE 6

| | 3M methanol permeation rate ($\mu mol \cdot cm^{-2} \cdot min^{-1}$) | | | Ion conductivity (S/cm) | | |
| --- | --- | --- | --- | --- | --- | --- |
| | Before treatment with aqueous 10M methanol solution | After treatment with aqueous 10M methanol solution | Proportion of change (%) | Before treatment with aqueous 10M methanol solution | After treatment with aqueous 10M methanol solution | Proportion of change (%) |
| Example 3-1 | 12.2 | 24.2 | 198 | 0.0610 | 0.0533 | 87 |
| Example 3-2 | 11.0 | 22.2 | 202 | 0.0651 | 0.0571 | 88 |
| Com. exam. 3-1 | 16.8 | 51.0 | 304 | 0.0750 | 0.0701 | 93 |
| Com. exam. 3-2 | 17.0 | 60.0 | 353 | 0.0470 | 0.0600 | 128 | the polymer block (A2b) forms a restraining phase and comprises a crystalline polyolefin block or a polymer block (A2b1) comprising as a main unit an aromatic vinyl compound unit represented by formula (III):

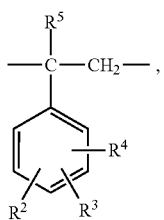

(III)

wherein each of $R^2$ to $R^4$ represents, mutually independently, a hydrogen atom or an alkyl group having 1 to 8 carbon atoms but at least one of them is an alkyl group having 1 to 8 carbon atoms, and $R^5$ represents a hydrogen atom or an alkyl group having 1 to 4 carbon atoms; and the polymer block (B) is a polymer block having a glass transition point or softening point of 50° C. or less and forms a flexible phase.

2. The electrolyte membrane according to claim 1, wherein:

the aromatic vinyl compound unit represented by the formula (II) is an aromatic vinyl compound unit represented by formula (IIa):

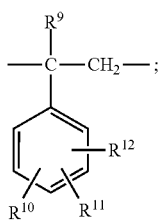

(IIa)

each of $R^{10}$ to $R^{12}$ represents, mutually independently, a hydrogen atom or an alkyl group having 1 to 4 carbon atoms; and $R^9$ represents a hydrogen atom, an alkyl group having 1 to 4 carbon atoms or a phenyl group.

3. The electrolyte membrane according to claim 1, wherein a mass ratio of the polymer block (A2b) to the polymer block (B) is 95:5 to 5:95.

4. The electrolyte membrane according to claim 1, wherein a mass ratio of the sum of the polymer block (A2a) and the polymer block (A2b) to polymer block (B) is 90:10 to 10:90.

5. The electrolyte membrane according to claim 1, wherein the polymer block (A2a) is cross-linked.

6. The electrolyte membrane according to claim 5, wherein the cross-linking is heat cross-linking, and $Ar^2$ in the general formula (II) is an aryl group having 6 to 14 carbon atoms which aryl group is substituted with one alkyl group having 1 to 8 carbon atoms in which alkyl group at least one hydrogen atom is bonded to the carbon atom at the 1-position, and can further have one or two substituents.

7. The electrolyte membrane according to claim 1, wherein the polymer block (B) is a polymer block having as a main unit at least one unit selected from the group consisting of
    an alkene unit having 2 to 8 carbon atoms,
    a cycloalkene unit having 5 to 8 carbon atoms,
    a vinylcycloalkene unit having 7 to 10 carbon atoms,
    a conjugated diene unit having 4 to 8 carbon atoms,
    a conjugated cycloalkadiene unit having 5 to 8 carbon atoms,
    a vinylcycloalkene unit having 7 to 10 carbon atoms wherein part or all of the carbon-carbon double bonds therein are hydrogenated,
    a conjugated diene unit having 4 to 8 carbon atoms wherein part or all of the carbon-carbon double bonds therein are hydrogenated, and
    a conjugated cycloalkadiene unit having 5 to 8 carbon atoms wherein part or all of carbon-carbon double bonds are hydrogenated.

8. The electrolyte membrane according to claim 7, wherein the polymer block (B) is a polymer block having as a main unit at least one unit selected from the group consisting of an alkene unit having 2 to 8 carbon atoms, a conjugated diene unit having 4 to 8 carbon atoms and a conjugated diene unit having 4 to 8 carbon atoms wherein part or all of carbon-carbon double bonds are hydrogenated.

9. The electrolyte membrane according to claim 1, wherein:
    the aromatic vinyl compound unit in the formula (III) is a p-methylstyrene unit or a 4-tert-butylstyrene unit; and
    the polymer block (B) is a polymer block having as a main unit at least one unit selected from the group consisting of a conjugated diene unit having 4 to 8 carbon atoms and a conjugated diene unit having 4 to 8 carbon atoms wherein part or all of carbon-carbon double bonds are hydrogenated.

10. The electrolyte membrane according to claim 1, wherein the ion-conducting group is a group represented by $-SO_3M$ or $-PO_3HM$ wherein M represents a hydrogen atom, an ammonium ion or an alkali metal ion.

11. The electrolyte membrane according to claim 1, wherein the ion exchange capacity is 0.30 meq/g or more.

12. A membrane electrode assembly, comprising the electrolyte membrane according to claim 1.

13. A polymer electrolyte fuel cell, comprising the electrolyte membrane according to claim 1.

14. The membrane of claim 1, wherein the polymer block (A2b) comprises the crystalline polyolefin block.

15. The membrane of claim 1, wherein the polymer block (A2b) comprises the polymer block (A2b1).

16. The membrane of claim 1, wherein the ion exchange capacity is more than 0.3 meq/g.

* * * * *